US008904995B2

(12) United States Patent
Nada

(10) Patent No.: US 8,904,995 B2
(45) Date of Patent: Dec. 9, 2014

(54) CONTROL APPARATUS OF INTERNAL COMBUSTION ENGINE

(75) Inventor: Mitsuhiro Nada, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 713 days.

(21) Appl. No.: 13/258,706

(22) PCT Filed: Apr. 22, 2009

(86) PCT No.: PCT/JP2009/058002
§ 371 (c)(1),
(2), (4) Date: Sep. 22, 2011

(87) PCT Pub. No.: WO2010/122643
PCT Pub. Date: Oct. 28, 2010

(65) Prior Publication Data
US 2012/0016571 A1 Jan. 19, 2012

(51) Int. Cl.
*F02B 5/00* (2006.01)
*F02D 41/40* (2006.01)
*F02D 41/30* (2006.01)
*F02D 41/36* (2006.01)
*F02B 1/12* (2006.01)
*F02B 3/06* (2006.01)
*F02B 23/06* (2006.01)
*F02B 29/04* (2006.01)
*F02D 41/00* (2006.01)
*F02M 25/07* (2006.01)

(52) U.S. Cl.
CPC .......... *F02D 41/402* (2013.01); *F02D 41/3064* (2013.01); *F02B 1/12* (2013.01); *F02B 3/06* (2013.01); *F02B 23/0657* (2013.01); *F02B 23/0672* (2013.01); *F02B 29/0406* (2013.01); *F02B 2275/14* (2013.01); *F02D 41/0057* (2013.01); *F02D 41/3035* (2013.01); *F02D 41/365* (2013.01); *F02D 41/403* (2013.01); *F02D 2250/36* (2013.01); *F02M 25/0707* (2013.01); *F02M 25/0713* (2013.01); *F02M 25/0727* (2013.01); *Y02T 10/44* (2013.01); *Y02T 10/123* (2013.01)
USPC ............................ 123/299; 123/305; 701/105

(58) Field of Classification Search
CPC . F02D 41/402; F02D 41/403; F02D 41/3035; F02D 41/3011; F02D 41/3029; F02D 41/3047; F02D 41/3064; F02B 3/06; F02B 3/08; F02B 3/10; F02B 3/12; F02B 3/2075; F02B 3/125
USPC .................... 123/295, 299, 300, 305, 568.11; 701/102, 103, 104, 105, 108
See application file for complete search history.

(56) References Cited

U.S. PATENT DOCUMENTS 6,907,870 B2 * 6/2005 zur Loye et al. ............... 123/594
6,994,077 B2 * 2/2006 Kobayashi et al. ...... 123/568.11
(Continued)

FOREIGN PATENT DOCUMENTS

| JP | 2001-164968 A | 6/2001 |
| JP | 2001-193526 A | 7/2001 |
| JP | 2001-221092 A | 8/2001 |
| JP | 2001-227393 A | 8/2001 |
| JP | 2002-188487 A | 7/2002 |
| JP | 2004-003415 A | 1/2004 |
| JP | 2008-267276 A | 11/2008 |
| WO | 02/066813 A1 | 8/2002 |

OTHER PUBLICATIONS

International Search Report mailed Jun. 16, 2009 of PCT/JP2009/058002.

*Primary Examiner* — Thomas Moulis
(74) *Attorney, Agent, or Firm* — Kenyon & Kenyon LLP

(57) ABSTRACT

A series of combustion forms including initial low-temperature combustion, premixed combustion, and diffusive combustion are performed when an engine operates under a low load and a medium load. The initial low-temperature combustion is carried out by performing a small-amount injection while performing an operation for lowering the encounter rate between oxygen and a fuel spray in a cylinder, and thereby the heat generation rate is kept low and the amount of NOx generated is suppressed. The premixed combustion is carried out as fuel receives heat in the initial low-temperature combustion, and the amount of smoke generated is suppressed. The diffusive combustion is accomplished as fuel travels through the combustion field of the premixed combustion, and by controlling the fuel injection timing thereof, it is possible to suitably control the timing at which the heat generation rate reaches its maximum in the aforementioned series of combustion. Thereby, it is possible to concurrently suppress the amount of NOx generated, suppress the amount of smoke generated, and secure the required torque.

9 Claims, 10 Drawing Sheets

(56) References Cited

U.S. PATENT DOCUMENTS

| | | | |
|---|---|---|---|
| 7,146,964 B2 * | 12/2006 | Norimoto et al. | 123/435 |
| 7,239,954 B2 * | 7/2007 | Huang | 701/103 |
| 7,277,790 B1 * | 10/2007 | Green et al. | 701/105 |
| 7,325,529 B2 * | 2/2008 | Ancimer et al. | 123/299 |
| 7,475,671 B1 * | 1/2009 | Fattic et al. | 123/406.47 |
| 7,677,222 B2 * | 3/2010 | Ishikawa | 123/299 |
| 8,036,812 B2 * | 10/2011 | Vigild et al. | 701/103 |
| 8,463,529 B2 * | 6/2013 | Hu | 701/104 |
| 8,670,918 B2 * | 3/2014 | Morinaga et al. | 701/108 |

* cited by examiner

CONTROL APPARATUS OF INTERNAL COMBUSTION ENGINE

This is a 371 national phase application of PCT/JP2009/058002 filed Apr. 22, 2009, the contents of which are incorporated herein by reference.

TECHNICAL FIELD

The present invention relates to a control apparatus of a compression self-ignition internal combustion engine represented by a diesel engine. Specifically, the present invention relates to a technique for improving combustion forms in a combustion chamber.

BACKGROUND ART

In engines that perform lean combustion, such as diesel engines, an operating range in which a mixture having a high air-fuel ratio (lean atmosphere) accounts for most of the entire operation range, causing concern regarding an emission of relatively large amounts of nitrogen oxides (hereinafter referred to as NOx). In order to address this problem, a NOx storage catalyst for storing (absorb) NOx contained in exhaust gas is installed in the exhaust path of an engine. NOx is stored in this NOx storage catalyst to clean the exhaust gas.

A known configuration for suppressing the amount of NOx generated by combustion in a combustion chamber is an exhaust gas recirculation (EGR) apparatus that recirculates part of exhaust gas in an intake path (for example, see PTL 1 and PTL 2 below).

The aforementioned EGR apparatus is provided with an EGR path by which an engine exhaust path and intake path are in communication with each other, and an EGR valve provided in the EGR path. By adjusting the opening degree of the EGR valve, the amount (EGR amount) of exhaust gas that is recirculated from the exhaust path to the intake path via the EGR path is adjusted to set an EGR rate in the intake air to a target EGR rate that has been set in advance. When part of the exhaust gas is returned to the intake path by the EGR apparatus in this way, the combustion temperature in the combustion chamber is reduced so that NOx generation is suppressed, and as a result, exhaust emissions are improved.

On the other hand, when incomplete combustion of an air-fuel mixture occurs in the combustion chamber in the expansion (combustion) stroke of the aforementioned diesel engine, smoke is generated in the exhaust gas, resulting in deteriorated exhaust emissions. To reduce the amount of this smoke, a technique has been proposed in which the main injection, which is fuel injection for obtaining engine torque, is divided into a plurality of divided main injections. In this case, the injection amount per main injection is reduced to overcome the shortage of oxygen in a combustion field, thus suppressing smoke generation.

CITATION LIST

[Patent Literature]
[PTL 1] JP 2004-3415A
[PTL 2] JP 2002-188487A
[PTL 3] JP 2001-221092A
[PTL 4] JP 2001-193526A
[PTL 5] JP 2001-164968A

DISCLOSURE OF INVENTION

Technical Problems

However, in the case of a configuration in which a relatively large amount of exhaust gas is returned to an intake path by an EGR apparatus so as to securely suppress the amount of NOx generated (for example, in the case of a configuration where the EGR rate is 30%), the amount of oxygen in intake air is greatly reduced. Therefore, if a main injection is performed so as not to generate smoke while avoiding incomplete combustion, the amount of fuel injected per main injection may have to be extremely reduced. As a result, fuel sufficient to obtain the engine torque requested by the driver (hereinafter referred to as the required torque) cannot be secured, resulting in engine torque shortage, and thus drivability may deteriorate.

Also, it is known that the injection timing of the aforementioned main injection is retarded to reduce the amount of NOx generated, but in this case as well, retarding the injection timing of the main injection impairs combustion efficiency, resulting in a no-torque period during which engine torque is temporarily lowered, and thus in deteriorated drivability.

As described above, it is difficult with conventional combustion forms in a combustion chamber to concurrently suppress the amount of NOx generated, suppress the amount of smoke generated, and secure the required torque.

Patent Literature 1 discloses an EGR rate that enables the amount of NOx generated and the amount of smoke generated to be both substantially "0" (specifically, an EGR rate of 55%). However, it appears that such a control technique is highly likely to result in misfire due to an excessively increased EGR rate, and difficult to obtain the aforementioned required torque. For example, in the case where variations in control occur and the EGR rate falls even slightly below the aforementioned value (an EGR rate of 55%), a large amount of smoke is generated. On the other hand, in the case where the EGR rate even slightly exceeds the aforementioned value, the engine stalls, and thus such a control technique lacks reliability and is not a practically applicable technique.

Patent Literature 2 discloses that, in an NOx catalyst regenerating operation, the excess air ratio is set low when premixed combustion is performed in a combustion chamber, and the excess air ratio is set high when diffusive combustion is performed to enhance the NOx purification rate while suppressing the amount of smoke generated. However, the technique disclosed in Patent Literature 2 is for enhancing the NOx purification rate in a regenerative operation of a NOx catalyst and does not enable the amount of NOx generated in association with combustion in a combustion chamber to be suppressed. That is, in Patent Literature 2 as well, it is difficult to concurrently suppress the amount of NOx generated, suppress the amount of smoke generated, and secure the required torque.

Patent Literature 3 discloses obtaining a NOx reducing effect by performing premixed combustion through a pilot injection and then diffusive combustion through a main injection. However, when the phrase "an increased pilot injection amount increases the amount of burnt gas generated by the time of the combustion of fuel in a main injection" is taken into consideration, it appears that, at the beginning of the main injection, the temperature in a cylinder is sufficiently increased (increased to the spontaneous ignition temperature of fuel or greater), and the heat generation rate in the cylinder at the time of diffusive combustion by the main injection is rapidly increased, and it is thus not possible to sufficiently obtain an NOx reducing effect. That is, in Patent Literature 3, the NOx reducing effect is limited, and it is difficult to greatly suppress the amount of NOx generated, suppress the amount of smoke generated, and secure the required torque concurrently.

Patent Literature 4 discloses a reduction in the amount of smoke generated that is attained by increasing the amount of intake air by supercharging, and enhancing combustibility by an auxiliary injection in a compression stroke. However, as in Patent Literature 3, at the time of diffusive combustion by a main injection, the temperature in a cylinder is sufficiently increased by premixed combustion brought about by the auxiliary injection, and thus the heat generation rate is rapidly increased and it is not possible to sufficiently obtain an NOx reducing effect. That is, in Patent Literature 4 as well, it is difficult to greatly suppress the amount of NOx generated, suppress the amount of smoke generated, and secure the required torque concurrently.

Patent Literature 5 discloses MK (Modulated Kinetic) combustion in which a combustion temperature is lowered by performing low-temperature premixed combustion using a large amount of EGR and a great swirl, thereby enabling the amount of NOx generated and the amount of smoke generated to be suppressed concurrently. However, in this MK combustion, the individual combustion process in each cylinder is performed by low-temperature premixed combustion, and it is difficult to control the ignition timing of an air-fuel mixture after pre-mixing of air and fuel, or in other words, it is difficult to control the combustion start timing in a cylinder, and it is difficult to control of the timing at which the heat generation rate associated with the combustion reaches its peak (maximum). As a result, it is possible that the combustion start timing and the heat generation rate peak timing shift greatly toward the angle of delay side, and in this case, engine torque is greatly reduced, and the required torque may not be secured.

The present invention has been achieved in view of the above, and an object thereof is to provide a control apparatus of an internal combustion engine that makes it possible to concurrently suppress the amount of NOx generated, suppress the amount of smoke generated, and secure the required torque.

Means for Solving the Problems

—Principles of Solution—

A principle of the solution provided by the present invention for achieving the above object performs three different combustion forms as combustion forms in a combustion chamber in a stepwise manner or partially simultaneously. First, initial combustion is performed at a low temperature to increase the temperature in a cylinder while inhibiting NOx generation. Performing this initial combustion (low-temperature combustion) allows premixed combustion to be performed as the subsequent combustion in the cylinder without arriving at diffusive combustion. Generation of smoke is suppressed by this premixed combustion. After performing a fuel injection for the premixed combustion, diffusive combustion is performed by injecting fuel into the cylinder whose temperature has been increased by the premixed combustion. By suitably managing the fuel injection timing for performing this diffusive combustion, a combustion form that can effectively generate the torque of an internal combustion engine is attained. That is, the timing at which the heat generation rate reaches its maximum in a series of these combustion forms is managed by the fuel injection timing for diffusive combustion. Note that the endothermic reaction at the beginning of a fuel injection for diffusive combustion prevents the heat generation rate from being excessively increased during the premixed combustion, thus suppressing the generating of NOx and an increase of combustion noises in the premixed combustion.

—Solving Means—

Specifically, the present invention is premised on a control apparatus of a compression self-igniting internal combustion engine that is provided with an exhaust gas recirculation apparatus that recirculates part of exhaust gas discharged by an exhaust system in an intake system, and that performs, during a combustion process of the internal combustion engine, a main injection that is a fuel injection for torque generation from a fuel injection valve. The control apparatus of an internal combustion engine is provided with a fuel injection control means that sets a "fuel injection period for initial combustion", "fuel injection period for diffusive combustion", and "fuel injection period for transitional combustion" as injection periods of the main injection. The "fuel injection period for initial combustion" is a fuel injection period for initial low-temperature combustion in which fuel is sequentially burnt in a cylinder while performing an encounter rate lowering operation that lowers an encounter rate between oxygen and a fuel spray in the cylinder. The "fuel injection period for diffusive combustion" is a fuel injection period for performing diffusive combustion by performing, when a temperature in the cylinder is at or greater than a predetermined diffusive combustion starting temperature that leads to diffusive combustion, a fuel injection toward a region where a combustion temperature suppressing effect that is attained by exhaust gas recirculated by the exhaust gas recirculation apparatus can be used. The "fuel injection period for transitional combustion" is a fuel injection period that is set between the "fuel injection period for initial combustion" and the "fuel injection period for diffusive combustion", and that is for performing transitional combustion composed of premixed combustion that continuously connects the initial low-temperature combustion and the diffusive combustion as fuel, which was injected when the temperature in the cylinder was lower than the diffusive combustion starting temperature after the initial low-temperature combustion had started, undergoes spray-cooling by an endothermic reaction of fuel injected in the subsequent "fuel injection period for diffusive combustion".

The fuel injection control means is also configured to set a penetration of fuel injected in the "fuel injection period for diffusive combustion" to be greater than the penetration of fuel injected in the "fuel injection period for initial combustion" and the "fuel injection period for transitional combustion".

Here, the term "encounter rate between oxygen and a fuel spray in a cylinder" refers to the probability (frequency) of oxygen molecules and fuel particles "meeting (undergoing a chemical reaction)" in the cylinder. The higher the encounter rate, the further the chemical reaction progresses, and the temperature in the cylinder is increased as the heat generation rate is increased. That is, performing an operation to reduce the encounter rate as described above keeps the progress of the chemical reaction small even in a case where the amount of oxygen molecules is small or the amount of fuel particles is large in some part of the cylinder (for example, a narrow region in the central part of the combustion chamber), thus enabling combustion to be sequentially performed at a low temperature (for example, about 800 K) in the cylinder. For example, by limiting the number of times oxygen molecules and fuel particles collide per unit volume in the cylinder or suppressing the momentum of oxygen molecules, the initial low-temperature combustion can be accomplished.

According to the aforementioned specific configuration, first, the initial low-temperature combustion, which is combustion of fuel injected in the "fuel injection period for initial combustion", is performed while the encounter rate between oxygen and a fuel spray in the cylinder is low, and therefore the heat generation rate, which is the amount of heat generated per unit time, is relatively small and the amount of NOx generated is suppressed. That is, in the initial low-temperature combustion, the temperature in the cylinder is increased while the amount of NOx generated is suppressed (the temperature is increased within a range not exceeding the aforementioned diffusive combustion starting temperature). Moreover, even when the air-fuel ratio of the injection region of fuel injected in this "fuel injection period for initial combustion" is rich, the combustion is low-temperature combustion as described above, and thus the injection region does not reach a smoke generating temperature, and smoke generation is also suppressed. This initial low-temperature combustion may be either diffusive combustion or premixed combustion.

Thereafter, in transitional combustion for connecting the initial low-temperature combustion and the diffusive combustion (combustion of fuel injected in the aforementioned "fuel injection period for transitional combustion"), premixed combustion that takes advantage of the amount of heat available in the cylinder whose temperature has been increased by the initial low-temperature combustion is carried out. That is, combustion is started from a region where an excess air ratio at which combustion can be performed with respect to the current temperature of the cylinder is obtained (for example, the excess air ratio is "1"). In other words, combustion is started when the air-fuel ratio of an air-fuel mixture reaches an air-fuel ratio at which ignition can be executed at the temperature of the region where the air-fuel mixture is present. In this case, there is no oxygen shortage in the combustion field, and thus the generation of smoke is suppressed.

When the temperature in the cylinder is at or higher than the aforementioned diffusive combustion starting temperature due to the aforementioned transitional combustion, a fuel injection in a "fuel injection period for diffusive combustion" begins, and the combustion form of this injected fuel is diffusive combustion in which combustion begins immediately after injection. Due to the fuel injection in the "fuel injection period for diffusive combustion", an excessive increase of the heat generation rate in the transitional combustion is inhibited. That is, the temperature in the cylinder is decreased by the endothermic reaction in the cylinder associated with the fuel injection in the "fuel injection period for diffusive combustion", and thus a change in the heat generation rate in the transitional combustion is mitigated, not resulting in an increase of combustion noises and NOx generation in this transitional combustion.

Moreover, the penetration of fuel is high because, for example, the fuel injection amount in the "fuel injection period for diffusive combustion" is set to be high (the fuel injection amount is set to be greater than that in the "fuel injection period for initial combustion" or the "fuel injection period for transitional combustion"). Therefore, this diffusive combustion by the injected fuel is performed in a relatively large region in the combustion chamber (region on the peripheral side of the combustion chamber) and performed in a region where the effect of the exhaust gas recirculated by the exhaust gas recirculation apparatus can be sufficiently used. Therefore, the combustion temperature in this diffusive combustion is suppressed to be relatively low, and the amount of NOx generated in this diffusive combustion is reduced.

Thus, according to this solving means, by connecting, via the aforementioned transitional combustion, initial low-temperature combustion (combustion executed by injecting fuel in a relatively low temperature environment) and diffusive combustion (combustion executed by injecting fuel in a relatively high temperature environment), which would not exist in the combustion process of conventional compression self-igniting internal combustion engines, this initial low-temperature combustion and diffusive combustion can both be present in the same combustion process without a no-torque period between them. Accordingly, the amount of NOx generated and the amount of smoke generated can be reduced as described above, and the aforementioned diffusive combustion can be executed by injecting fuel into the cylinder whose temperature has been increased by the transitional combustion. Therefore, it is possible, by controlling the "fuel injection period for diffusive combustion", to control the start timing of this diffusive combustion and to control the timing at which the heat generation rate reaches its maximum (combustion center of gravity) in a series of combustion (combustion across initial low-temperature combustion and diffusive combustion). It is thus possible to prevent the timing at which the heat generation rate reaches its maximum from greatly shifting toward the angle of delay side and to secure the required torque of an internal combustion engine.

An example of the technique for performing spray cooling on the fuel injected in the "fuel injection period for transitional combustion" by the endothermic reaction of fuel injected in the "fuel injection period for diffusive combustion" is as follows. That is, the aforementioned fuel injection control means is configured to substantially synchronize a start timing of the "fuel injection period for diffusive combustion" with a combustion start timing of fuel injected in the "fuel injection period for transitional combustion", and to substantially synchronize a finishing timing of the "fuel injection period for diffusive combustion" with a timing at which a heat generation rate in combustion of fuel injected in the "fuel injection period for transitional combustion" reaches its maximum.

Specifically, there are the following two types of fuel injection forms performed by the aforementioned fuel injection control means in the respective fuel injection periods. First, the first type is: as for fuel injections in the "fuel injection period for initial combustion", the "fuel injection period for transitional combustion", and the "fuel injection period for diffusive combustion", the fuel injection control means is configured to suspend a fuel injection after termination of a fuel injection in the "fuel injection period for initial combustion", then start a fuel injection in the "fuel injection period for transitional combustion", suspend a fuel injection after termination of a fuel injection in this "fuel injection period for transitional combustion", and then start a fuel injection in the "fuel injection period for diffusive combustion".

The second type is: as for fuel injections in the "fuel injection period for initial combustion", the "fuel injection period for transitional combustion", and the "fuel injection period for diffusive combustion", the fuel injection control means is configured to perform a fuel injection in the "fuel injection period for initial combustion" and a fuel injection in the "fuel injection period for transitional combustion" by a continuous fuel injection without stopping, and, on the other hand, to suspend a fuel injection after termination of a fuel injection in the "fuel injection period for transitional combustion" and then start a fuel injection in the "fuel injection period for diffusive combustion".

According to the former fuel injection form, it is possible to individually set a fuel injection amount and a fuel injection timing for each of the initial low-temperature combustion, transitional combustion, and diffusive combustion. It is thus possible to readily specify the fuel injection form to suitably control the heat generation rate and the extent of an increase of the temperature in the cylinder in the respective combustions and is possible to precisely manage the temperature in the cylinder in each combustion.

On the other hand, according to the latter fuel injection form, it is possible to set the interval of the opening or closing operation of the fuel injection valve so as to be relatively long, thereby enabling the above-described three combustion forms to be accomplished even with the fuel injection valve having a relatively low opening or closing speed (low response) and the cost of a fuel injection system to be low. Moreover, the number of injections by the fuel injection valve can be reduced, and it is thus possible to reduce the amount of injected fuel that flows in the same region (for example, a region near the nozzle of the fuel injection valve), and even if the fuel injection amount in the "fuel injection period for initial combustion" is relatively large, it is possible to suppress smoke generation in this region that is associated with the subsequent fuel injections.

Specifically, at least one operation selected from an exhaust gas recirculation operation by the exhaust gas recirculation apparatus, an intake throttling operation in the intake system, an operation for retarding a timing of a fuel injection from the fuel injection valve, and an operation for lowering the temperature in the cylinder is performed as the aforementioned encounter rate lowering operation.

Through these operations, the oxygen concentration in intake air is reduced, the amount of intake air is reduced, and the kinetic energy of oxygen molecules and fuel particles in the cylinder is reduced, thus effectively lowering the aforementioned encounter rate and enabling the aforementioned initial low-temperature combustion to be readily accomplished.

Specific examples of the respective fuel injection periods are as follows. First, a period in which the temperature in the cylinder is in a range from 750 K to less than 900 K is set as the "fuel injection period for initial combustion." A period in which the temperature in the cylinder is in a range from 800 K to less than 900 K after the initial low-temperature combustion has started is set as the "fuel injection period for transitional combustion." A period after the temperature in the cylinder reaches 900 K after the transitional combustion has started is set as the "fuel injection period for diffusive combustion."

Generally, when the temperature in the cylinder exceeds 900 K, self-ignition occurs even in a region where the excess air ratio is relatively small, thereby resulting in diffusive combustion in which combustion starts immediately after fuel injection. Therefore, the temperature in the cylinder is set to be in a range of less than 900 K for the "fuel injection period for initial combustion" for the aforementioned initial low-temperature combustion and for the "fuel injection period for transitional combustion" for the aforementioned transitional combustion. It is highly unlikely that an air-fuel mixture undergoes self-ignition when the temperature in the cylinder is less than 750 K even when the excess air ratio in the cylinder is "1", and therefore the temperature in the cylinder is set to be in a range of 750 K or greater for the "fuel injection period for initial combustion" for the initial low-temperature combustion. Thereby, it is possible to perform the processes for setting the respective fuel injection periods.

It is possible to further reduce the excess air ratio if the spray injected from the fuel injection valve can be improved. Therefore, a value (for example, 950 K or 1000 K) that is high for the upper limit of the temperature in the cylinder in the aforementioned "fuel injection period for initial combustion" can be set even while smoke generation is suppressed. That is, the upper limit of the temperature in the cylinder in the "fuel injection period for initial combustion" can be suitably set according to the state of the spray in the cylinder.

Fuel injections in the above-described "fuel injection period for initial combustion", "fuel injection period for transitional combustion", and "fuel injection period for diffusive combustion" are performed when the internal combustion engine operates under a low load and a medium load, and the proportion of the fuel injection amount in the "fuel injection period for transitional combustion" relative to the total injection amount, which is a sum of the amounts of fuel injected in the respective injection periods, is set such that the greater the load in a region from the low-load operation to the medium-load operation, the greater the proportion.

Thereby, the peak value of the heat generation rate in a medium-load region where the total amount of fuel injected is relatively increased can be kept low, and thus an increase of the amount of NOx generated or an increase of combustion noises that are associated with the aforementioned diffusive combustion does not occur.

Fuel injections in the above-described "fuel injection period for initial combustion", "fuel injection period for transitional combustion", and "fuel injection period for diffusive combustion" are performed when the internal combustion engine operates under a low load and a medium load, and when the internal combustion engine operates under a high load, initial diffusive combustion is performed in which the average heat generation rate over a predetermined period during an earlier period after combustion has started in the cylinder is substantially identical to the average heat generation rate over a period in which the aforementioned initial low-temperature combustion is performed.

In the diffusive combustion performed after the above-described initial low-temperature combustion performed in a low-load operation or a medium-load operation, torque suitable when the internal combustion engine operates under a high load may not be obtained sufficiently. Therefore, in a high-load operation, the region that is in a combustion process is subjected entirely to diffusive combustion to increase the combustion rate, and in initial diffusive combustion, which is an initial stage of this diffusive combustion (for example, within a crank angle of 10° CA from the beginning of combustion), the average heat generation rate in this period is configured to be substantially identical to the average heat generation rate in the period in which the aforementioned initial low-temperature combustion is performed so that the amount of NOx generated can be suppressed. That is, in this initial diffusive combustion, the amount of NOx generated is suppressed by performing pseudo low-temperature combustion, thereby enabling the required torque to be obtained while improving exhaust emissions in a high-load operation.

Effects of the Invention

In the present invention, introducing transitional combustion composed of premixed combustion between initial low-temperature combustion and diffusive combustion, which would not exist in the same combustion process of conventional compression self-igniting internal combustion engines, enables this initial low-temperature combustion and diffusive combustion to both be present. Accordingly, it is possible to concurrently suppress the amount of NOx generated, suppress the amount of smoke generated, and secure the required torque, thereby enabling exhaust emissions to be improved and drivability to be improved.

MODE FOR CARRYING OUT THE INVENTION

An embodiment of the invention is described below with reference to the drawings. In the present embodiment, a case will be described in which the invention is applied to a common rail in-cylinder direct injection multi-cylinder (for example, inline four-cylinder) diesel engine (compression self-igniting internal combustion engine) mounted in an automobile.

—Engine Configuration—

Figure 1:
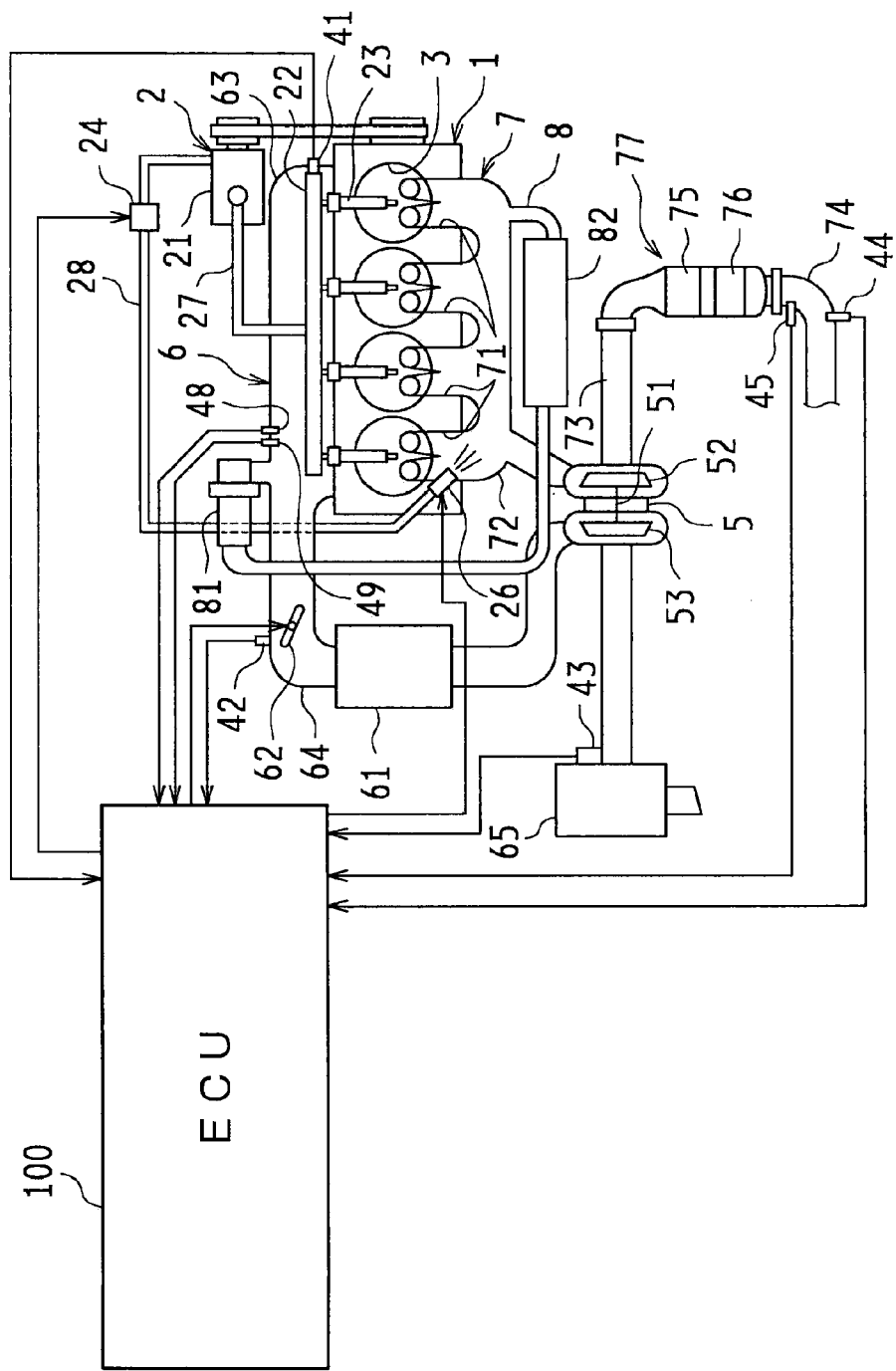
FIG. 1 is a schematic configuration diagram of an engine and the control system thereof according to an embodiment.
Figure 2:
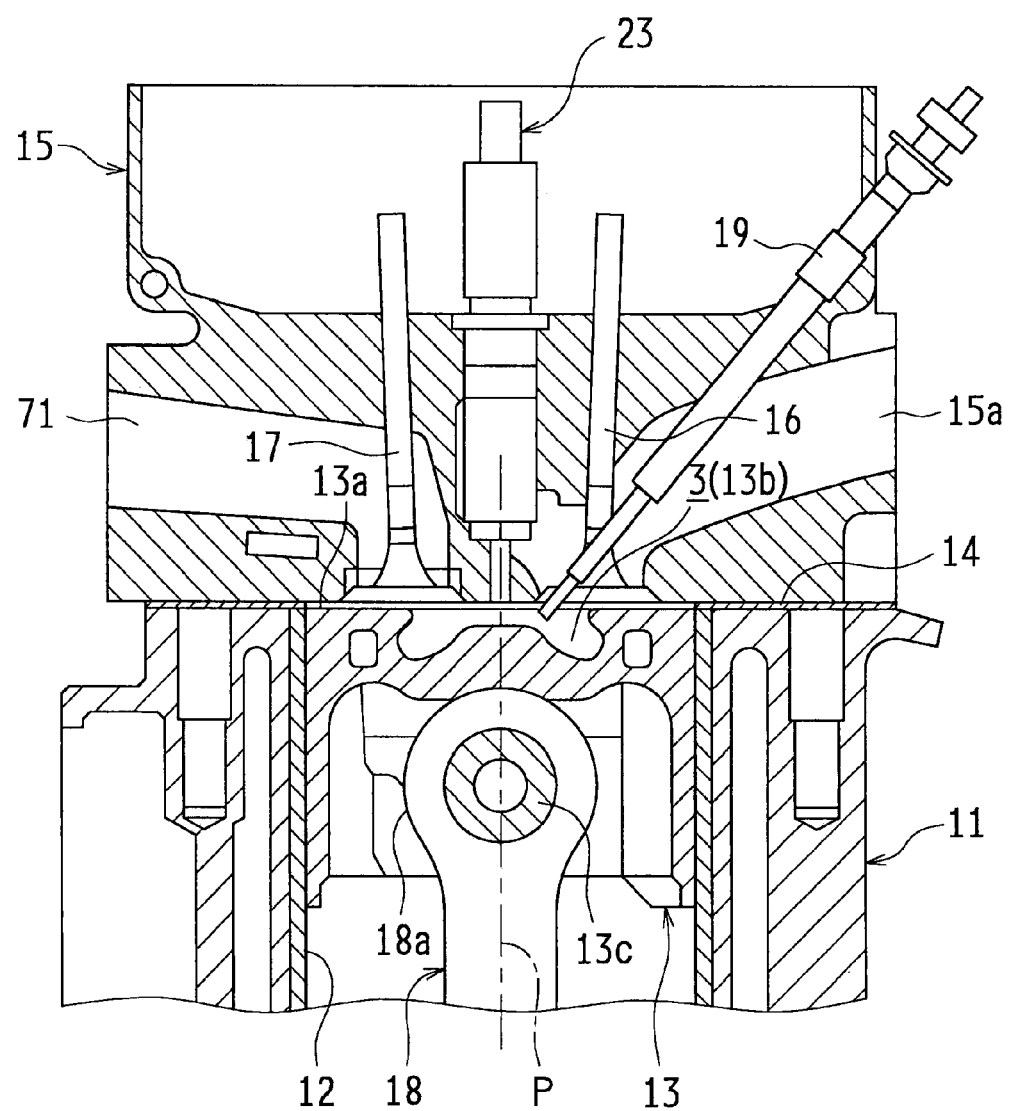
FIG. 2 is a cross-sectional view showing a combustion chamber of a diesel engine and parts in the vicinity of the combustion chamber.

First, the overall configuration of a diesel engine (referred to below as simply the engine) according to the present embodiment will be described. FIG. 1 is a schematic configuration diagram of an engine 1 and a control system of the engine 1 according to the present embodiment. FIG. 2 is a cross-sectional view showing a combustion chamber 3 of the diesel engine and parts in the vicinity of the combustion chamber 3.

As shown in FIG. 1, the engine 1 according to the present embodiment is configured as a diesel engine system having a fuel supply system 2, combustion chambers 3, an intake system 6, an exhaust system 7, and the like as its main portions.

The fuel supply system 2 is provided with a supply pump 21, a common rail 22, injectors (fuel injection valves) 23, a cutoff valve 24, a fuel addition valve 26, an engine fuel path 27, an added fuel path 28, and the like.

The supply pump 21 draws fuel from a fuel tank, and after putting the drawn fuel under high pressure, supplies the fuel to the common rail 22 via the engine fuel path 27. The common rail 22 has a function as an accumulation chamber where the high pressure fuel supplied from the supply pump 21 is held (accumulated) at a specific pressure, and this accumulated fuel is distributed to each injector 23. The injectors 23 are configured from piezo injectors within which a piezoelectric element (piezo element) is provided, and supply fuel by injection into the combustion chambers 3 by appropriately opening a valve. The details of control of fuel injection from the injectors 23 will be described later.

Also, the supply pump 21 supplies part of the fuel drawn from the fuel tank to the fuel addition valve 26 via the added fuel path 28. In the added fuel path 28, the cutoff valve 24 is provided in order to stop fuel addition by cutting off the added fuel path 28 during an emergency.

The fuel addition valve 26 is configured from an electronically controlled opening/closing valve whose valve opening period is controlled with an addition control operation by an ECU 100 that will be described later such that the amount of fuel added to the exhaust system 7 becomes a target addition amount (an addition amount such that exhaust A/F becomes target A/F), or such that a fuel addition timing becomes a specific timing. In other words, a desired amount of fuel is supplied from the fuel addition valve 26 by injection to the exhaust system 7 (to an exhaust manifold 72 from exhaust ports 71) at a suitable timing.

The intake system 6 is provided with an intake manifold 63 connected to an intake port 15a formed in a cylinder head 15 (see FIG. 2), and an intake pipe 64 that constitutes an intake path is connected to the intake manifold 63. Also, in this intake path, an air cleaner 65, an airflow meter 43, and a throttle valve (intake throttling valve) 62 are disposed in order from the upstream side. The airflow meter 43 outputs an electrical signal according to the amount of air that flows into the intake path via the air cleaner 65.

The exhaust system 7 is provided with the exhaust manifold 72 connected to the exhaust ports 71 formed in the cylinder head 15, and exhaust pipes 73 and 74 that constitute an exhaust path are connected to the exhaust manifold 72. Also, in this exhaust path a maniverter (exhaust purification apparatus) 77 is disposed that is provided with a NOx storage catalyst (NSR catalyst: NOx storage reduction catalyst) 75 and a diesel particulate-NOx reduction catalyst (DPNR catalyst) 76. Hereinafter, this NSR catalyst 75 and DPNR catalyst 76 will be described.

The NSR catalyst 75 is a storage reduction NOx catalyst and is configured using, for example, alumina ($Al_2O_3$) as a support, with, for example, an alkali metal such as potassium (K), sodium (Na), lithium (Li), or cesium (Cs), an alkaline earth element such as barium (Ba) or calcium (Ca), a rare earth element such as lanthanum (La) or yttrium (Y), and a precious metal such as platinum (Pt) supported on this support.

The NSR catalyst 75, in a state in which a large amount of oxygen is present in exhaust gas, stores NOx, and in a state in which the oxygen concentration in exhaust gas is low and a large amount of reduction component (for example, an unburned component of fuel (HC)) is present, reduces NOx to $NO_2$ or NO and releases the resulting $NO_2$ or NO. NOx that has been released as $NO_2$ or NO is further reduced due to quickly reacting with HC or CO in exhaust gas and becomes $N_2$. Also, by reducing $NO_2$ or NO, HC and CO themselves are oxidized and thus become $H_2O$ and $CO_2$. In other words, by suitably adjusting the oxygen concentration or the HC component in exhaust gas introduced into the NSR catalyst 75, it is possible to purify HC, CO, and NOx in the exhaust gas. In the configuration of the present embodiment, adjustment of the oxygen concentration or the HC component in exhaust gas can be performed with an operation to add fuel from the fuel addition valve 26.

On the other hand, in the DPNR catalyst 76, a NOx storage reduction catalyst is supported on a porous ceramic structure, for example, and PM in exhaust gas is captured while passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/burns the captured PM (for example, an oxidization catalyst whose main component is a precious metal such as platinum) is supported on the DPNR catalyst 76.

Here, the combustion chamber 3 of the diesel engine and parts in the vicinity of the combustion chamber 3 will be described with reference to FIG. 2. As shown in FIG. 2, in a cylinder block 11 that constitutes part of the engine, a cylindrical cylinder bore 12 is formed in each cylinder (each of four cylinders), and a piston 13 is housed within each cylinder bore 12 such that the piston 13 can slide in the vertical directions.

The combustion chamber 3 is formed on the top side of a top face 13*a* of the piston 13. In other words, the combustion chamber 3 is defined by a lower face of the cylinder head 15 installed on top of the cylinder block 11 via a gasket 14, an inner wall face of the cylinder bore 12, and the top face 13*a* of the piston 13. A cavity (recess) 13*b* is concavely provided in substantially the center of the top face 13*a* of the piston 13, and this cavity 13*b* also constitutes part of the combustion chamber 3.

The shape of this cavity 13*b* is such that the recess size of its center portion (on a cylinder centerline P) is small, and the recess size is increased toward the peripheral side. That is, as shown in FIG. 2, when the piston 13 is near the compression top dead center, the combustion chamber 3 formed by this cavity 13*b* is configured such that the combustion chamber is a narrow space having a relatively small volume at the center portion, and the space is gradually increased toward the peripheral side (has an enlarged space).

A small end 18*a* of a connecting rod 18 is linked to the piston 13 by a piston pin 13*c*, and a large end of the connecting rod 18 is linked to a crankshaft that is an engine output shaft. Thus, back and forth movement of the piston 13 within the cylinder bore 12 is transmitted to the crankshaft via the connecting rod 18, and engine output is obtained due to rotation of this crank shaft. Also, a glow plug 19 is disposed facing the combustion chamber 3. The glow plug 19 glows due to the flow of electrical current immediately before the engine 1 is started, and functions as a starting assistance apparatus whereby ignition and combustion are promoted due to part of a fuel spray being blown onto the glow plug.

In the cylinder head 15, the intake port 15*a* that introduces air into the combustion chamber 3 and the exhaust port 71 that discharges exhaust gas from the combustion chamber 3 are formed, and an intake valve 16 that opens/closes the intake port 15*a* and an exhaust valve 17 that opens/closes the exhaust port 71 are disposed. The intake valve 16 and the exhaust valve 17 are disposed facing each other on either side of a cylinder center line P. That is, this engine 1 is configured as a cross flow-type engine. Also, the injector 23 that injects fuel directly into the combustion chamber 3 is installed in the cylinder head 15. The injector 23 is disposed substantially in the center above the combustion chamber 3, in an erect orientation along the cylinder center line P, and injects fuel introduced from the common rail 22 toward the combustion chamber 3 at a specific timing.

Furthermore, as shown in FIG. 1, the engine 1 is provided with a turbocharger 5. This turbocharger 5 is equipped with a turbine wheel 52 and a compressor wheel 53 that are linked via a turbine shaft 51. The compressor wheel 53 is disposed facing the inside of the intake pipe 64, and the turbine wheel 52 is disposed facing the inside of the exhaust pipe 73. Thus the turbocharger 5 uses exhaust flow (exhaust pressure) received by the turbine wheel 52 to rotate the compressor wheel 53, thereby performing a so-called supercharging operation that increases the intake pressure. In this embodiment, the turbocharger 5 is a variable nozzle-type turbocharger, in which a variable nozzle vane mechanism (not shown) is provided on the turbine wheel 52 side, and by adjusting the opening degree of this variable nozzle vane mechanism it is possible to adjust the supercharging pressure of the engine 1.

An intercooler 61 for forcibly cooling intake air heated due to supercharging with the turbocharger 5 is provided in the intake pipe 64 of the intake system 6. The throttle valve 62 provided on the downstream side from the intercooler 61 is an electronically controlled opening/closing valve whose opening degree is capable of stepless adjustment, and has a function to constrict the area of the channel of intake air under specific conditions, and thus adjust (reduce) the amount of intake air supplied.

Also, the engine 1 is provided with an exhaust gas recirculation path (EGR path) 8 that connects the intake system 6 and the exhaust system 7. The EGR path 8 decreases the combustion temperature by appropriately directing part of the exhaust gas back to the intake system 6 and resupplying that exhaust gas to the combustion chamber 3, thus suppressing the amount of NOx generated. Also, provided in the EGR path 8 are an EGR valve 81 that by being opened/closed steplessly under electronic control is capable of freely adjusting the flow rate of exhaust gas that flows through the EGR path 8, and an EGR cooler 82 for cooling exhaust that passes through (recirculates through) the EGR path 8. The EGR apparatus (exhaust gas recirculation apparatus) is configured with this EGR path 8, EGR valve 81, EGR cooler 82, and the like.

—Sensors—

Various sensors are installed at respective sites of the engine 1, and these sensors output signals related to environmental conditions at the respective sites and the operating state of the engine 1.

For example, the airflow meter 43 outputs a detection signal according to the flow rate of intake air (the amount of intake air) on the upstream side of the throttle valve 62 within the intake system 6. An intake temperature sensor 49 is disposed in the intake manifold 63 and outputs a detection signal according to the temperature of intake air. An intake pressure sensor 48 is disposed in the intake manifold 63 and outputs a detection signal according to the intake air pressure. An A/F (air-fuel ratio) sensor 44 outputs a detection signal that continuously changes according to the oxygen concentration in exhaust gas on the downstream side of the maniverter 77 of the exhaust system 7. An exhaust temperature sensor 45 likewise outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

—ECU—

Figure 3:
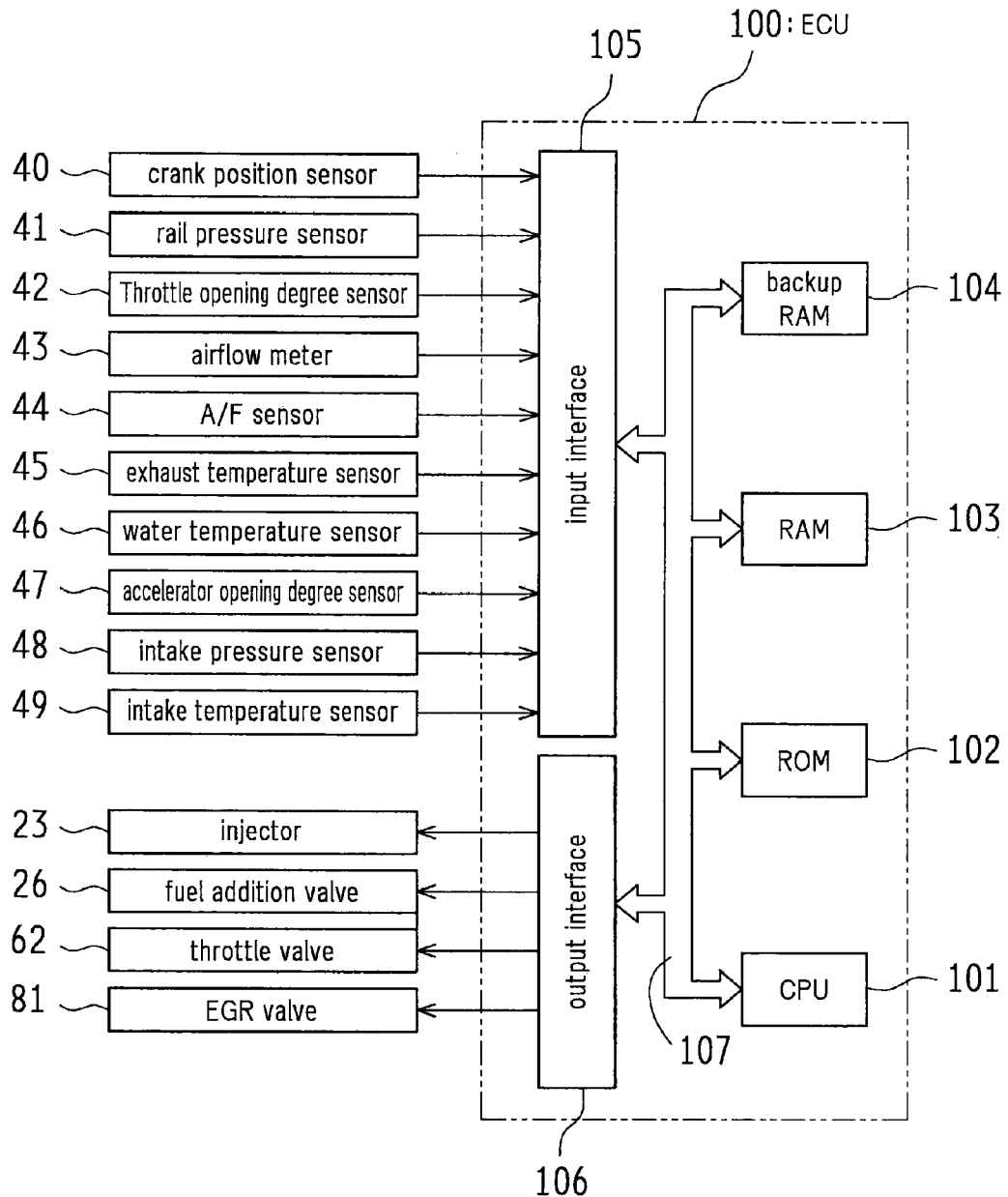
FIG. 3 is a block diagram showing the configuration of a control system such as an ECU.

As shown in FIG. 3, the ECU 100 is provided with a CPU 101, a ROM 102, a RAM 103, a backup RAM 104, and the like. In the ROM 102, various control programs, maps that are referred to when executing those various control programs, and the like are stored. The CPU 101 executes various computational processes based on the various control programs and maps stored in the ROM 102. The RAM 103 is a memory that temporarily stores data resulting from computation with the CPU 101 or data that has been input from the respective sensors. The backup RAM 104 is a nonvolatile memory that stores that data or the like to be saved when the engine 1 is stopped, for example.

The CPU 101, the ROM 102, the RAM 103, and the backup RAM 104 are connected to each other via a bus 107, and are connected to an input interface 105 and an output interface 106 via the bus 107.

The input interface 105 is connected to the rail pressure sensor 41, the throttle opening degree sensor 42, the airflow meter 43, the A/F sensor 44, the exhaust temperature sensor 45, the intake pressure sensor 48, and the intake temperature sensor 49. Furthermore, the input interface 105 is connected to a water temperature sensor 46 that outputs a detection signal according to the coolant temperature of the engine 1, an accelerator opening degree sensor 47 that outputs a detection signal according to the amount of accelerator pedal depression, a crank position sensor 40 that outputs a detection signal (pulse) each time the output shaft (crankshaft) of the engine 1 rotates a specific angle, and the like. On the other hand, the output interface 106 is connected to the injectors 23, the fuel addition valve 26, the throttle valve 62, the EGR valve 81, and the like.

The ECU 100 executes various controls of the engine 1 based on the output of the aforementioned various sensors. For example, the ECU 100 controls the opening degree of the EGR valve 81 according to the operating state of the engine 1 and adjusts the amount of exhaust gas recirculated towards the intake manifold 63 (EGR amount). This EGR amount is set according to an EGR map stored in advance in the aforementioned ROM 102. Specifically, this EGR map is for determining an EGR amount (EGR rate) using the engine revolution number and the engine load as parameters and for setting an EGR amount that can suppress the amount of NOx emitted to the exhaust system. This EGR map is created in advance by conducting experiments or simulations or the like. That is, the EGR amount (opening degree of the EGR valve 81) is obtained by applying to the EGR map an engine revolution number calculated based on a detection value of the aforementioned crank position sensor 40 and an opening degree of the throttle valve 62 (corresponding to the engine load) detected by the throttle opening degree sensor 42.

Furthermore, the ECU 100 executes fuel injection control of the injector 23. In this embodiment, auxiliary injections such as pilot injection, pre-injection, after-injection, and post-injection that are performed in conventional ordinary diesel engines are not performed, and only a main injection for obtaining engine torque is performed as the fuel injection control of this injector 23.

The total fuel injection amount in this main injection is set as a necessary fuel injection amount for obtaining the required torque determined according to the operating state, such as engine revolution number, amount of accelerator operation, coolant temperature, and intake air temperature, as well as environmental conditions. For example, the greater the engine revolution number (engine revolution number calculated based on the value detected by the crank position sensor 40) or the greater the amount of accelerator operation (the amount of accelerator pedal depression detected by the accelerator opening degree sensor 47) (i.e., the greater the accelerator opening degree), the greater the resulting torque requirement value of the engine 1.

—Fuel Injection Pressure—

The fuel injection pressure when executing the aforementioned main fuel injections is determined based on the internal pressure of the common rail 22. In regard to the internal pressure of the common rail, normally, the higher the engine load and the greater the engine revolution number, the greater the target value for the pressure of fuel supplied from the common rail 22 to the injectors 23 (i.e., the target rail pressure). In other words, when the engine load is high, a large amount of air is drawn into the combustion chamber 3, making it necessary to inject a large amount of fuel into the combustion chamber 3 from the injectors 23, and therefore the pressure of injection from the injectors 23 needs to be high. Also, when the engine revolution number is high, the period during which injection is possible is short, making it necessary to inject a large amount of fuel per unit time, and therefore the pressure of injection from the injectors 23 needs to be high. As described above, the target rail pressure is generally set based on the engine load and the engine revolution number. This target rail pressure is set according to a fuel pressure setting map stored in, for example, the ROM 102. That is, determining the fuel pressure according to this fuel pressure setting map allows the valve opening period (injection rate waveform) of the injectors 23 to be controlled, and it is thus possible to specify the fuel injection amount during that valve opening period.

The optimum values of fuel injection parameters in the aforementioned main injections differ according to the temperature conditions of the engine 1, intake air, and the like.

For example, the ECU 100 adjusts the amount of fuel discharged by the supply pump 21 such that the common rail pressure becomes the same as the target rail pressure set based on the engine operating state, i.e., such that the fuel injection pressure matches the target injection pressure. Also, the ECU 100 determines the fuel injection amount and the fuel injection form based on the engine operating state. Specifically, the ECU 100 calculates an engine revolution speed based on the value detected by the crank position sensor 40, obtains an amount of accelerator pedal depression (accelerator opening degree) based on the value detected by the accelerator opening degree sensor 47, and determines the total main injection amount (injection amount in the main injections) based on the engine revolution speed and the accelerator opening degree.

—Divided Main Injections—

In the diesel engine 1, it is important to concurrently satisfy demands such as improving exhaust emissions by suppressing the amount of NOx generated and the amount of smoke generated, reducing combustion noises during a combustion stroke, and ensuring sufficient engine torque. The inventors of the present invention, noting that as a technique for concurrently satisfying such demands, it is effective to suitably control combustion forms in a cylinder during a combustion stroke, found a fuel injection technique that uses divided main injections as described below as a technique to control combustion forms. A specific description is given below.

In this embodiment, three divided main injections are performed as the aforementioned injection forms of the main injection such that the forms of combustion in the combustion chamber 3 of fuel injected according to the respective divided main injections are mutually different while securing the total main injection amount (the total fuel injection amount for obtaining the required torque) required in the main injections.

Specifically, the injection timings (timings at which fuel injection is started) in the respective divided main injections and the injection periods (that correlate with the injection amount per divided main injection) are set such that the combustion forms of fuel (spray) injected in the respective divided main injections are mutually different. A specific description is given below.

The outline of the combustion forms in the combustion process in the combustion chamber 3 in this embodiment is as follows. In the aforementioned combustion forms, initial low-temperature combustion and diffusive combustion are performed, and transitional combustion to connect these initial low-temperature combustion and diffusive combustion by premixed combustion is performed, in the same combustion process. That is, these mutually different combustion forms are successively performed in the same combustion process in the same combustion chamber. In other words, the successiveness of these mutually different combustion forms is achieved by introducing transitional combustion, which is the second-step combustion, between initial low-temperature combustion, which is the first-state combustion, and diffusive combustion, which is the third-step combustion.

More specifically, the aforementioned initial low-temperature combustion, which is first-step combustion, is performed by injecting fuel while performing an encounter rate lowering operation by which the encounter rate between oxygen and a fuel spray in a cylinder is lowered (a fuel injection in a fuel injection period for initial combustion as referred to herein), and due to the combustion of that fuel, fuel in the cylinder burns sequentially. Specifically, a predetermined period in which the temperature in the cylinder is in a range from 750 K to less than 900 K is set as the aforementioned fuel injection period for initial combustion, and the aforementioned main injection for low-temperature combustion is performed to execute the aforementioned initial low-temperature combustion. As described above, since the upper limit of the temperature in the cylinder in the "fuel injection period for initial combustion" can be suitably set according to the state of the spray in the cylinder and there is a case where the upper limit may be increased because of a large EGR amount, the upper limit is not limited to 900 K and may be 950 K or 1000 K (a case where the upper limit is 900 K is described below as an example).

Transitional combustion (premixed combustion), which is second-step combustion, is combustion resulting from a fuel injection performed when, after the aforementioned initial low-temperature combustion is started, the temperature in the cylinder is less than a predetermined diffusive combustion starting temperature (for example, 900 K) that leads to diffusive combustion (a fuel injection in a fuel injection period for transitional combustion as referred to herein). Specifically, a predetermined period in which the combustion field temperature of the initial low-temperature combustion is in a range from 800 K to less than 900 K is set as the aforementioned fuel injection period for transitional combustion, and the aforementioned main injection for transitional combustion is performed to execute the aforementioned transitional combustion.

Diffusive combustion, which is third-step combustion, is combustion resulting from a fuel injection performed when, after the aforementioned premixed combustion is started, the temperature in the cylinder is at or higher than the aforementioned diffusive combustion starting temperature due to the premixed combustion (a fuel injection in a fuel injection period for diffusive combustion as called herein). Specifically, the aforementioned main injection for diffusive combustion is performed immediately after the combustion field of the transitional combustion reaches 900 K to execute the diffusive combustion.

As for fuel injection amounts to achieve the respective combustion forms, the fuel injection amount of a fuel injection to perform transitional combustion (hereinafter referred to as a main injection for transitional combustion), which is second-step combustion, is set to be greater than the fuel injection amount of a fuel injection to perform initial low-temperature combustion (hereinafter referred to as a main injection for low-temperature combustion), which is first-step combustion. Also, the fuel injection amount of a fuel injection to perform diffusive combustion (hereinafter referred to as a main injection for diffusive combustion), which is third-step combustion, is set to be greater than the fuel injection amount of a fuel injection to perform transitional combustion, which is second-step combustion (an fuel injection control operation by the fuel injection control means). Thereby, a penetration of fuel injected in the main injection for transitional combustion is set to be greater than the penetration of fuel injected in the main injection for low-temperature combustion, and the penetration of fuel injected in the main injection for diffusive combustion is set to be greater than the penetration of fuel injected in the main injection for transitional combustion. A detailed description of this penetration will be provided later.

In this embodiment, the above-described combustion forms (three combustion forms that are mutually different and performed successively) are performed when the engine 1 operates under a low load and a medium load, and when the engine 1 operates under a high load, diffusive combustion is performed through two fuel injections as described below.

Hereinafter, the fuel injection amounts forms in the respective load conditions and the corresponding combustion forms in the combustion chamber 3 will now be described individually.

Figure 4:
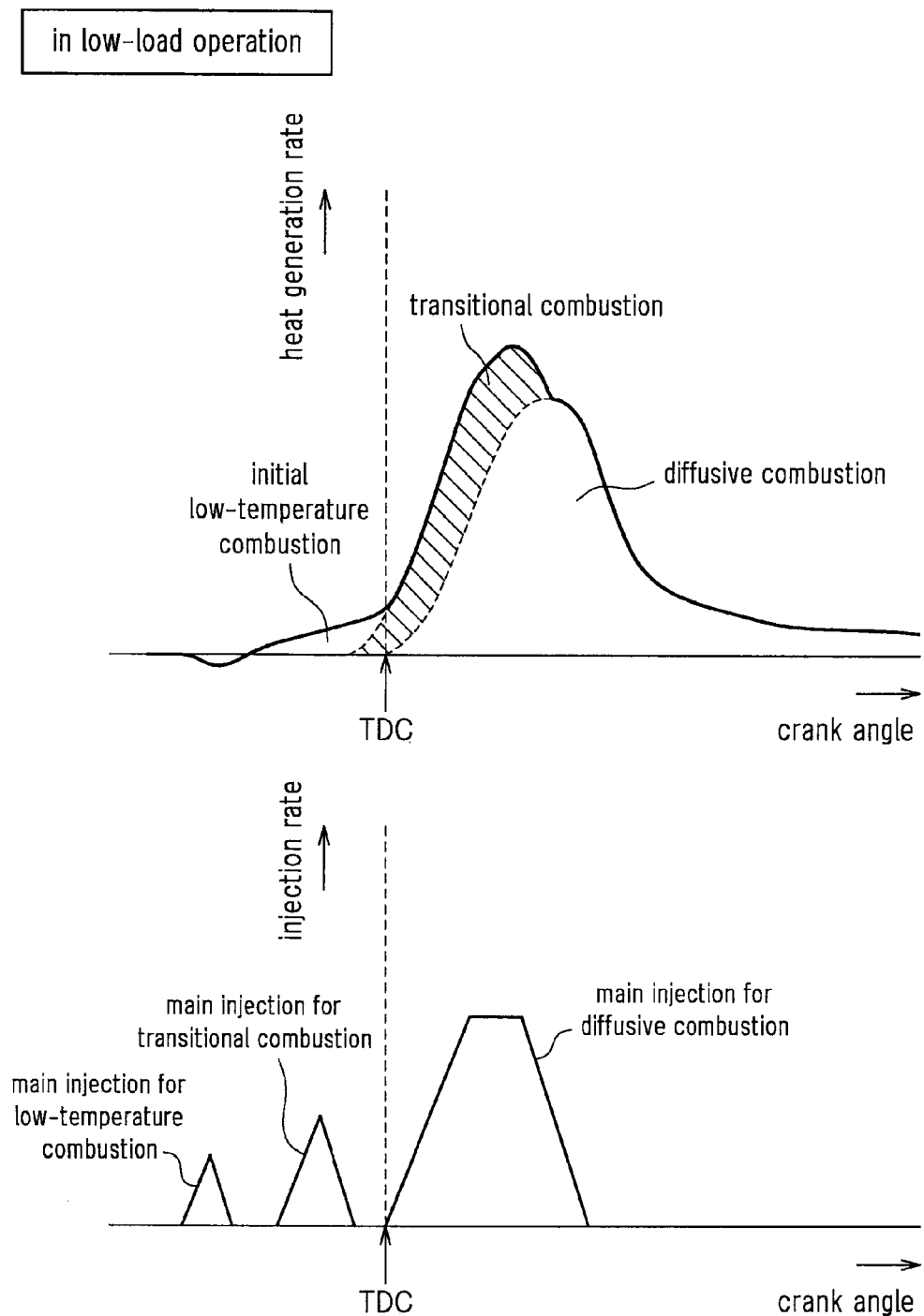
FIG. 4 depicts charts showing a change in a heat generation rate and a fuel injection pattern in a cylinder when an engine operates under a low load.
Figure 5:
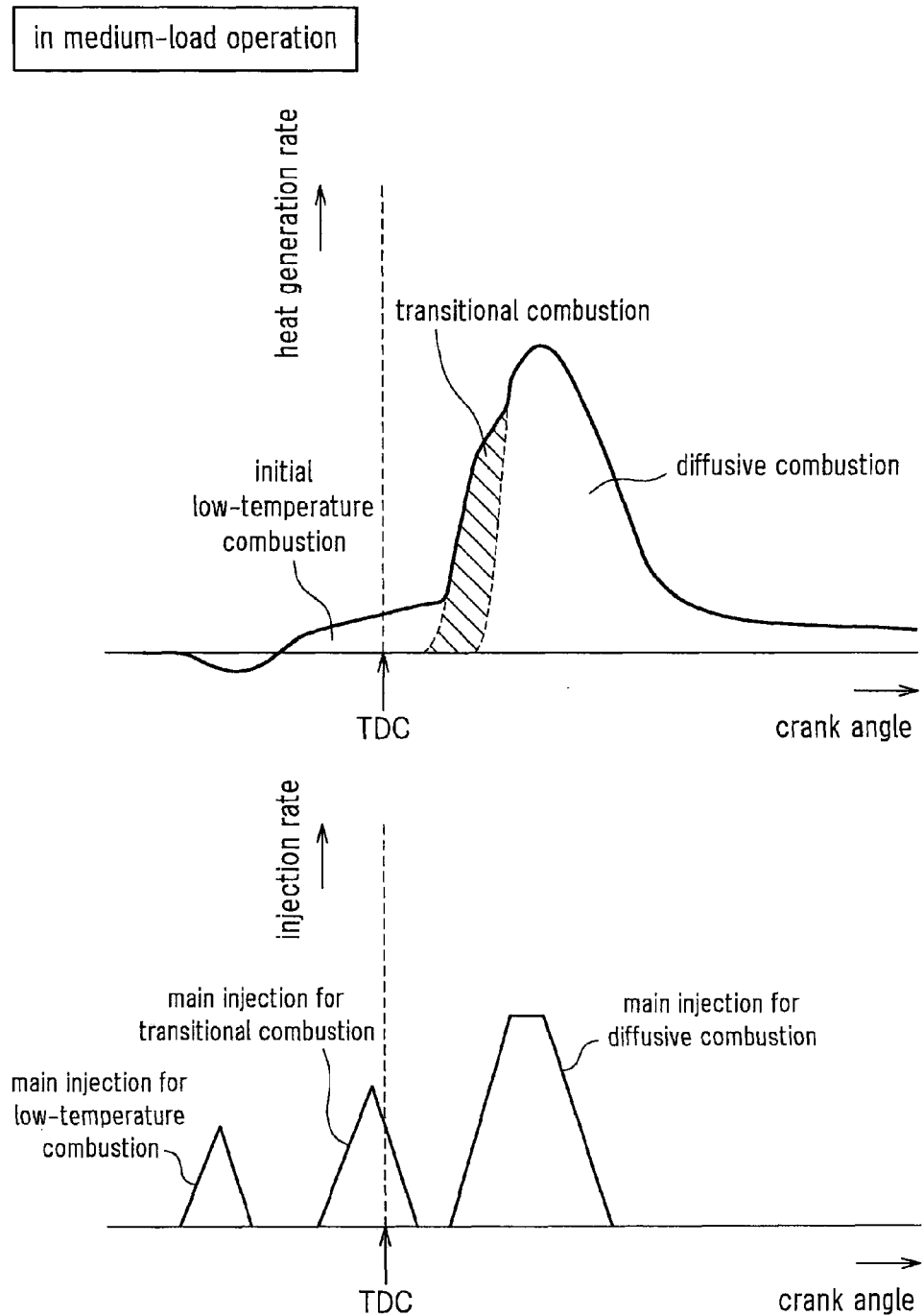
FIG. 5 depicts charts showing a change in the heat generation rate and the fuel injection pattern in the cylinder when an engine operates under a medium load.
Figure 6:
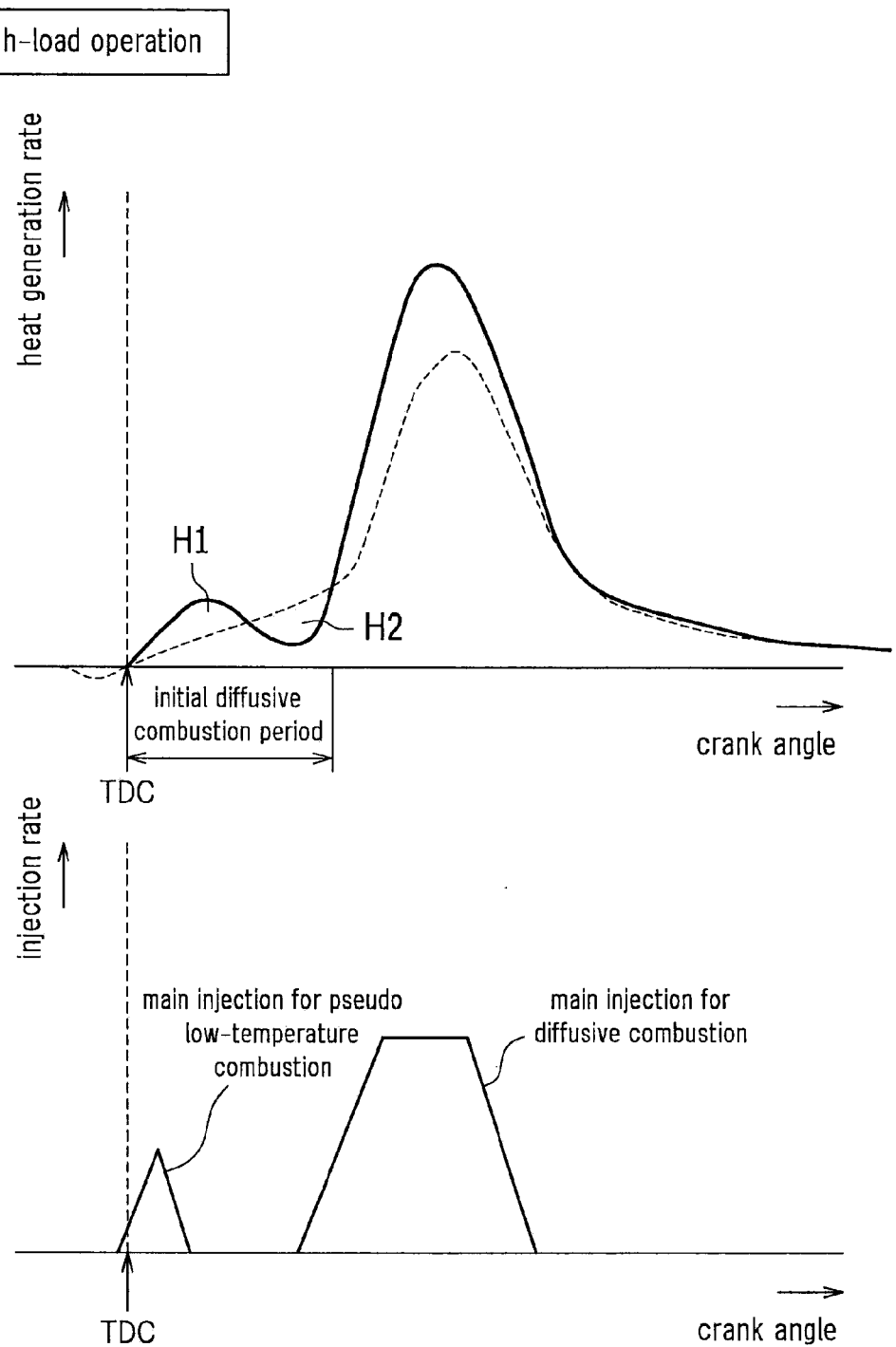
FIG. 6 depicts charts showing a change in heat generation rate and the fuel injection pattern in the cylinder when an engine operates under a high load.

FIG. 4 depicts charts showing a change in heat generation rate and a fuel injection pattern in the cylinder when the engine 1 operates under a low load and when main injections are performed. FIG. 5 depicts charts showing a change in heat generation rate and the fuel injection pattern in the cylinder when the engine 1 operates under a medium load and when main injections are performed. FIG. 6 depicts charts showing a change in heat generation rate and the fuel injection pattern in the cylinder when the engine 1 operates under a high load and when main injections are performed.

In the waveforms showing a change in heat generation rate in those figures, the horizontal axis represents the crank angle and the vertical axis represents the heat generation rate. In the waveforms showing the fuel injection pattern in those figures, the horizontal axis represents the crank angle and the vertical axis represents the injection rate (corresponding to the amount of retreating movement of a needle provided on the injector 23). In the figures, "TDC" indicates a crank angle position corresponding to the compression top dead center of the piston 13.

Figure 7:
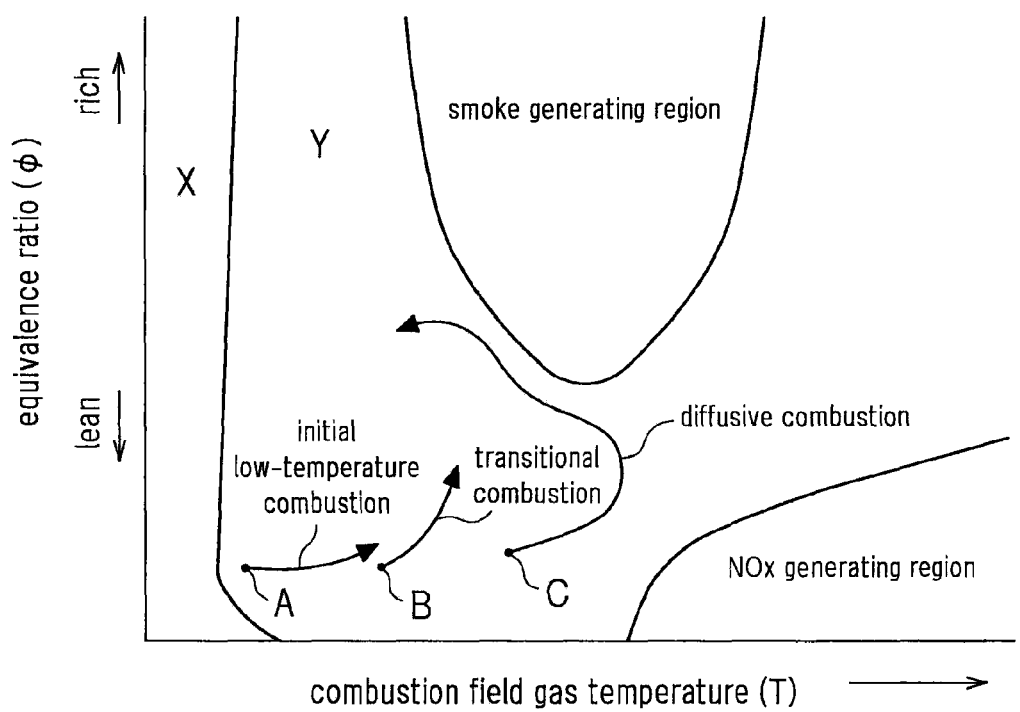
FIG. 7 depicts a φT map showing a change in gas temperature and the equivalence ratio of a combustion field when the respective divided main injections are performed.

FIG. 7 is a map (generally called a $\phi T$ map) showing a change in gas temperature at a combustion field that is a region where fuel is injected in the respective fuel injection periods in the combustion chamber 3 when the engine 1 operates under a low load (for example, at each of the ten combustion fields in the combustion chamber 3 (more specifically, in the cavity 13b) in the case of an injector 23 that has ten nozzles) and change in a equivalence ratio at the combustion field. That is, FIG. 7 indicates with arrows a change in the respective combustion field environments (the gas temperature and the equivalence ratio of a combustion field) of the combustion field of fuel injected in a main injection for low-temperature combustion for performing the aforementioned initial low-temperature combustion, which is first-step combustion, the combustion field of fuel injected in a main injection for transitional combustion to perform the transitional combustion, which is second-step combustion, and the combustion field of fuel injected in a main injection for diffusive combustion for performing the diffusive combustion, which is third-step combustion, in the case where main injections (the respective divided main injections) are performed according to the fuel injection patterns shown in FIG. 4.

In FIG. 7, in the case where the combustion field environment reaches the smoke generating region, smoke is generated in exhaust gas. This smoke generating region is a region where the combustion field gas temperature is relatively high and the equivalence ratio of the combustion field is on the rich side. Also, in the case where the combustion field environment reaches the NOx generating region, NOx is generated in exhaust gas. This NOx generating region is a region where the combustion field gas temperature is relatively high and the equivalence ratio of the combustion field is on the lean side. Also, the region X shown in FIG. 7 is a region where HC is likely to be generated in exhaust gas, and the region Y is a region where CO is likely to be generated in exhaust gas.

As shown in FIGS. 4 and 5, the main injection for low-temperature combustion is a main injection arranged farthest into the angle of advance side among the respective divided main injections. The main injection for transitional combustion is a main injection arranged more toward the angle of delay side than the aforementioned main injection for low-temperature combustion is, and the injection amount is set to be larger than that in the main injection for low-temperature combustion. The main injection for diffusive combustion is a main injection arranged still more toward the angle of delay side than the aforementioned main injection for transitional combustion is, and the injection amount is set to be larger than that in the main injection for transitional combustion. The injection amounts of the divided main injections will be discussed later.

A predetermined interval is provided between this main injection for low-temperature combustion and main injection for transitional combustion and between this main injection for transitional combustion and main injection for diffusive combustion. That is, after performing the main injection for low-temperature combustion, a fuel injection is suspended (injectors 23 are blocked), and after a predetermined interval, the main injection for transitional combustion is started. Also, after performing the main injection for transitional combustion, a fuel injection is suspended (injectors 23 are blocked), and after a predetermined interval, the main injection for diffusive combustion is started. This interval is set as an interval that enables spray cooling, for example, set as a shortest valve closing period (which is determined according to the performance of the injectors 23, or the shortest period from valve closure to the beginning of valve opening of the injectors 23: for example, 200 μs). More specifically, the aforementioned interval is set such that the start timing of the aforementioned main injection for diffusive combustion is substantially synchronized with the start timing of the aforementioned transitional combustion. This interval of the divided main injections is not limited to the aforementioned value and is suitably set as described below such that the functions in the respective combustions are demonstrated.

Hereinbelow, a description is provided of the injection forms of the respective divided main injections performed in a low-load operation, a medium-load operation, and a high-load operation. The total main injection amount in a low-load operation is set to be 30 mm$^3$, the total main injection amount in a medium-load operation is set to be 40 mm$^3$, and the total main injection amount in a high-load operation is set to be 60 mm$^3$. The total main injection amounts are not limited to these values.

(In Low-Load Operation)
<Main Injection for Low-Temperature Combustion>

As shown in FIG. 4, in the aforementioned main injection for low-temperature combustion in a low-load operation, an injection is started on the angle of advance side (for example, 15° BTDC) relative to the compression top dead center (TDC) of the piston 13, and an injection is terminated on the angle of advance side relative to the compression top dead center of the piston 13. Because the main injection for low-temperature combustion is started at this timing, combustion (initial low-temperature combustion) of fuel injected in the main injection for low-temperature combustion is started before the piston 13 reaches the compression top dead center (TDC) as described above. The fuel injection amount (corresponding to the valve opening period of the injector 23) in the main injection for low-temperature combustion in a low-load operation is set to be, for example, 2 mm$^3$. The amount is not limited to this value. Accordingly, in the main injection for low-temperature combustion, since the fuel injection amount is small and the penetration of the fuel is relatively weak, the initial low-temperature combustion is performed in a central portion of the combustion chamber. For example, the initial low-temperature combustion is performed in a relatively small region as indicated by the region α in FIG. 8 (cross-sectional view showing the right half of the upper part of the piston).

In the injection period of this main injection for low-temperature combustion, an encounter rate lowering operation for lowering the encounter rate between oxygen and a fuel spray in the cylinder is performed. At least one operation selected from an exhaust gas recirculation operation by the aforementioned EGR apparatus, an intake throttling operation in the intake system, an operation for retarding a timing of a fuel injection from the injector 23, and an operation for lowering the temperature in the cylinder is performed as this encounter rate lowering operation. Specific examples of the intake throttling operation in the aforementioned intake system include an intake throttling operation by the throttle valve 62 disposed in the intake system, an operation to reduce the supercharging of a turbocharger 5, and an intake throttling operation by a swirl control valve (SCV) that is not shown but disposed in the intake system. Examples of the operation for lowering the temperature in the cylinder include an operation for enhancing the cooling capability of an intercooler 61 or the EGR cooler 82, and an operation for lowering the compression ratio in the cylinder.

For example, in the case where the exhaust recirculation operation by an EGR apparatus is performed singly, the target EGR rate is set to be, for example, 30% to control the opening degree of the EGR valve 81. In the case where the intake throttling operation is performed singly, the opening degree of the throttle valve 62 is restricted to 75% for example. In the case where the operation for retarding the timing of fuel injection from the injector 23 is performed singly, the fuel injection timing is in an ATDC region, which is after the piston 13 has reached the compression top dead center (TDC). In this case, the waveforms shown in FIG. 4 are shifted toward the angle of delay side, and the aforementioned fuel injection period for initial combustion, fuel injection period for transitional combustion, and fuel injection period for diffusive combustion are also shifted toward the angle of delay side. In the case where the above-described operation for lowering the temperature in the cylinder, such as enhancing the cooling capability of the EGR cooler 82 and the cooling capability of the intercooler 61, is performed, the kinetic energy of oxygen molecules and fuel particles in the cylinder is reduced, thus effectively lowering the aforementioned encounter rate. The aforementioned rates and opening degrees are not limited to the values presented above.

The main injection for low-temperature combustion is performed while such an encounter rate lowering operation is performed, and thus the combustion of fuel injected in the main injection for low-temperature combustion is performed at a relatively low temperature in the cylinder (for example, about 800 K) and thus the combustion progresses while the heat generation rate remains low. Therefore, the temperature in the cylinder is increased gradually (for example, to about 850 K) without triggering an increase of the amount of NOx generated or an increase of combustion noises associated with a sudden increase of the heat generation rate. Even if the air-fuel ratio of the injection region (the aforementioned region α) of fuel injected in this main injection for low-temperature combustion is rich, the combustion is low-temperature combustion as described above, and therefore the injection region does not reach the smoke generating temperature, and generation of smoke is also suppressed (see the initial low-temperature combustion in FIG. 7).

The injection amount (corresponding to the valve opening period of the injector 23) in the main injection for low-temperature combustion is set through, for example, experiments or simulations.

<Main Injection for Transitional Combustion>

In the aforementioned main injection for transitional combustion, after the combustion (initial low-temperature combustion) of fuel injected in the aforementioned main injection for low-temperature combustion is started, a fuel injection is started near the timing at which the heat generation rate by the low-temperature combustion reaches the maximum value (peak value) or shortly before the heat generation rate reaches the maximum value. For example, an injection is started near 8° BTDC. That is, the fuel injection amount in the main injection for low-temperature combustion is relatively small, and thus the peak value of the heat generation rate by the initial low-temperature combustion is also relatively low. Once the heat generation rate passes the peak value, the heat generation rate gradually decreases. In the main injection for transitional combustion, an injection is started before the heat generation rate by the initial low-temperature combustion passes the peak value so that the main injection for transitional combustion uses the heat in the cylinder obtained by the initial low-temperature combustion.

The fuel injection amount in the main injection for transitional combustion is set to be 6 mm$^3$. The amount is not limited to this value. As described above, the fuel injected in the main injection for transitional combustion has a greater penetration than the fuel injected in the main injection for low-temperature combustion, and therefore the fuel travels through the combustion field (combustion field for the initial low-temperature combustion) of fuel injected in the main injection for low-temperature combustion, and at this time, the fuel receives the heat of the combustion field and the temperature is increased. However, since the temperature in the cylinder is still relatively low (about 850 K) the fuel injected in the main injection for transitional combustion does not reach diffusive combustion and undergoes premixed combustion (see the portion with diagonal lines in the heat generation rate waveform in FIG. 4). That is, the fuel injected in the main injection for transitional combustion and air present in the cylinder are agitated, and combustion is started from a region where an excess air ratio of substantially "1" is reached. For example, the aforementioned premixed combustion is performed in the region β in FIG. 8.

Because such premixed combustion is performed, the combustion (transitional combustion) of fuel injected in the main injection for transitional combustion is combustion that occurs in a region where a sufficient amount of oxygen is secured, and thus the amount of smoke generated is greatly reduced.

The injection amount in the main injection for transitional combustion is set through, for example, experiments or simulations.

<Main Injection for Diffusive Combustion>

In the aforementioned main injection for diffusive combustion, after the combustion (transitional combustion) of fuel injected in the aforementioned main injection for transitional combustion, a fuel injection is started at the timing at which the temperature in the cylinder exceeds a temperature (900 K) at which diffusive combustion can be carried out. For example, an injection is started near the TDC. That is, the fuel injected in the main injection for diffusive combustion undergoes diffusive combustion in which the fuel burns sequentially immediately after the injection.

The fuel injection amount in the main injection for diffusive combustion is set to be 12 mm$^3$, for example. The amount is not limited to this value. As described above, the fuel injected in the main injection for diffusive combustion has a greater penetration than the fuel injected in the main injection for transitional combustion, and therefore the fuel travels through the combustion field of fuel injected in the main injection for low-temperature combustion (the region indicated with α in FIG. 8) and the combustion field of fuel injected in the main injection for transitional combustion (the region indicated with β in FIG. 8), and at this time, the fuel receives the heat of the combustion fields and the temperature is increased, and the fuel reaches a relatively large space in the combustion chamber 3 (space on the peripheral side in the aforementioned cavity 13b: the region indicated with γ in FIG. 8), and in this portion, the combustion temperature reducing effect of exhaust gas recirculated by the aforementioned EGR apparatus is sufficiently demonstrated. Thereby, diffusive combustion is performed without triggering an increase of the amount of NOx generated or an increase of combustion noises. The region 6 in FIG. 8 is a region where the fuel injected in the main injection for diffusive combustion burns while being returned toward the cylinder center side by an air stream generated so as to travel along the inner wall of the cavity 13b.

Figure 8:
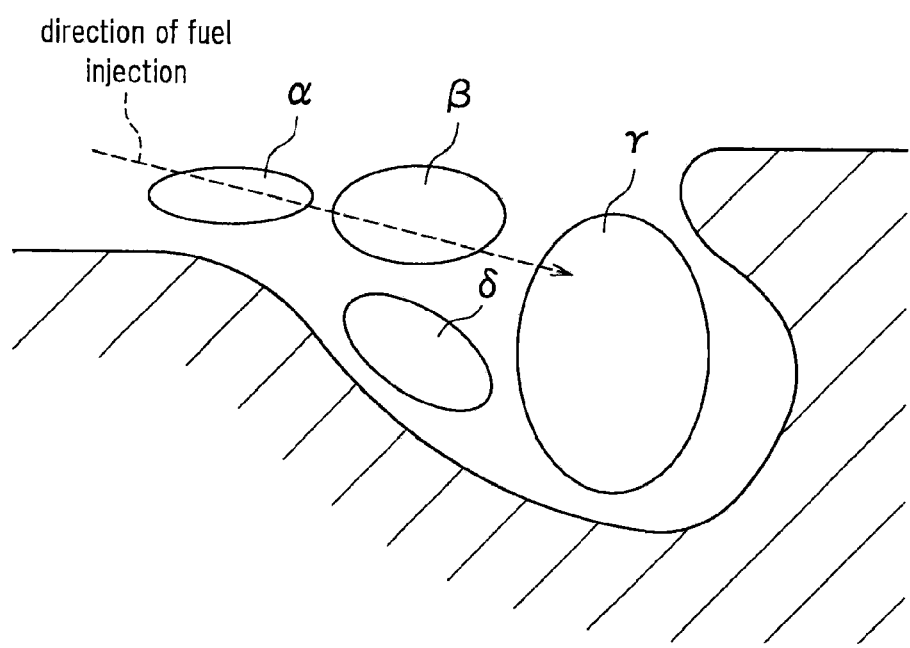
FIG. 8 is a cross-sectional view showing an upper portion of a piston showing combustion fields in the combustion chamber in the respective combustion forms.

In the description provided above, a case where the respective regions are independent of each other was described, with the region α of FIG. 8 serving as the combustion field of the initial low-temperature combustion, the region β of FIG. 8 serving as the combustion field of the transitional combustion, and, the region γ of FIG. 8 serving as the combustion field of the diffusive combustion, but there may be a case where these regions partially overlap.

Since the fuel injection amount in the main injection for diffusive combustion is relatively large, during an earlier period after the injection has started, the combustion field of the aforementioned premixed combustion is cooled by the endothermic reaction of the injected fuel, and the steepness of the heat generation rate in the premixed combustion is mitigated. That is, an increase of combustion noises and NOx generation in the premixed combustion are suppressed. As for a preferable injection timing of the main injection for diffusive combustion to obtain this effect, the start timing of the main injection for diffusive combustion is substantially synchronized with the start timing of the aforementioned transitional combustion, and the finishing timing of the main injection for diffusive combustion is substantially synchronized with the timing at which the heat generation rate in the aforementioned transitional combustion reaches its maximum.

Since the combustion for the main injection for diffusive combustion is diffusive combustion, controlling the fuel injection timing thereof enables the peak timing of the heat generation rate in that combustion to be controlled. A specific description is given below.

Since preheating inside the cylinder is sufficiently executed by the aforementioned transitional combustion, in the case where the main injection for diffusive combustion is started in this state, the fuel injected in the main injection for diffusive combustion undergoes thermal decomposition by being immediately exposed to a temperature environment having a self-igniting temperature or greater, and combustion starts immediately after injection.

Specifically, fuel ignition delay in a diesel engine includes physical delay and chemical delay. Physical delay refers to the time it takes fuel droplets to evaporate/mix, and depends on the gas temperature in the combustion field. On the other hand, chemical delay refers to the time it takes fuel vapor to chemically bond/decompose and to oxidatively generate heat. In a condition in which preheating of the cylinder is sufficient as described above, such physical delay is minimized, and as a result, ignition delay also is minimized.

Therefore, the combustion form of fuel injected in the aforementioned main injection for diffusive combustion is mostly diffusive combustion. As a result, the control of the fuel injection timing in the main injection for diffusive combustion as-is substantially serves as a control of the combustion timing of diffusive combustion and the heat generation rate peak timing, and it is thus possible to significantly improve combustion controllability. That is, by controlling the heat generation rate waveform of the diffusive combustion, it is possible to significantly improve combustion controllability. For example, by starting the main injection for diffusive combustion near the TDC as stated above, it is possible to have the heat generation rate peak timing at 10° ATDC.

The injection amount in the main injection for diffusive combustion also is set through, for example, experiments or simulations.

<Penetration>

Next, the penetration of fuel injected in the aforementioned respective main injections is described in more detail. In the aforementioned injector 23, when a fuel injection is started in response to an injection command signal, a needle that blocks the nozzle retreats from the nozzle, thus gradually increasing the nozzle opening area. When the needle moves to the farthest retreating position, the largest nozzle opening area is reached. However, if the injection command signal is canceled before the needle reaches the farthest retreating position (if a valve closing command is received), the needle moves forward in a valve closing direction in the middle of the retreating movement. That is, in this case, a fuel injection is terminated without reaching the largest nozzle opening area. Therefore, the longer the injection period is set, the larger the nozzle opening area attained.

The aforementioned nozzle opening area correlates with the travel distance of fuel (spray) injected from the nozzle. That is, in the case where fuel is injected when the nozzle opening area is large, the size of a fuel droplet injected from the nozzle is also large, and thus the kinetic energy is also large (penetration is large). Therefore, the travel distance of this fuel droplet is long. On the other hand, in the case where fuel is injected when the nozzle opening area is small, the size of a fuel droplet injected from the nozzle is also small, and thus the kinetic energy is also small (penetration is small). Therefore, the travel distance of this fuel droplet is short.

As described above, in the case where the valve opening period of the injector 23 is set to be relatively long (in other words, in the case where the injection amount per main injection is set to be relatively large), the needle moves to the farthest retreating position and therefore the largest nozzle opening area is reached, and the travel distance of the fuel droplet in this case is long. That is, most of fuel injected from the injector 23 is capable of traveling to near the peripheral edge of the aforementioned cavity 13b.

On the other hand, in the case where the valve opening period of the injector 23 is set to be relatively short (in other words, in the case where the injection amount per main injection is set to be relatively small), the needle does not move to the farthest retreating position and the nozzle opening area is small, and therefore the travel distance of the fuel droplet in this case is short. That is, most of fuel injected from the injector 23 is capable of traveling no farther than the central portion of the aforementioned cavity 13b.

As described above, the nozzle opening area determined by the valve opening period of the injector 23 and the travel distance of fuel (spray) injected from the nozzle correlate with each other. Therefore, by adjusting the valve opening period of the injector 23, it is possible to adjust the travel distance of fuel. In other words, the nozzle opening area determined by the injection amount per main injection and the travel distance of fuel (spray) injected from the nozzle correlate with each other. Therefore, by specifying the injection amount per main injection, it is possible to specify the travel distance of fuel.

Therefore, in this embodiment, the injection period of the main injection for transitional combustion is set to be longer than the injection period of the main injection for low-temperature combustion, and the injection period of the main injection for diffusive combustion is set to be longer than the injection period of the main injection for transitional combustion. Accordingly, the fuel injection amount in the main injection for transitional combustion is larger than the fuel injection amount in the main injection for low-temperature combustion, and the penetration is also greater. The fuel injection amount in the main injection for diffusive combustion is larger than the fuel injection amount in the main injection for transitional combustion, and the penetration is also greater.

Therefore, as described above, the combustion field of fuel injected in the main injection for low-temperature combustion is formed over a relatively small area along the inner peripheral portion of the cavity 13b (region α in FIG. 8). The combustion field of fuel injected in the main injection for transitional combustion is formed on the outer periphery side relative to the combustion field of fuel injected in the main injection for low-temperature combustion (region β in FIG. 8). Moreover, the combustion field of fuel injected in the main injection for diffusive combustion is formed over a relatively enlarged area along the outer peripheral portion of the cavity 13b (region γ in FIG. 8).

Therefore, as described above, the fuel injected in the main injection for transitional combustion travels through the combustion field of fuel injected in the main injection for low-temperature combustion, i.e., travels through the combustion field where the aforementioned initial low-temperature combustion is carried out, and at this time, the fuel receives the heat of the combustion field and undergoes the aforementioned premixed combustion. The fuel injected in the main injection for diffusive combustion travels through not only the combustion field of fuel injected in the main injection for low-temperature combustion but also the combustion field of fuel injected for transitional combustion, i.e., travels through the combustion field where the aforementioned premixed combustion is carried out, and at this time, the fuel receives the heat of the combustion field and undergoes the aforementioned diffusive combustion.

Such a change in the combustion field environment in performing main injections will now be described using FIG. 7. As described above, FIG. 7 is a map showing a change in gas temperature of the combustion field and equivalence ratio of the combustion field.

As shown in FIG. 7, when the main injection for low-temperature combustion is started (point A in FIG. 7), there is little change in equivalence ratio of the combustion field because the fuel injection amount is relatively small, and due to the combustion (initial low-temperature combustion) of the fuel, the combustion field gas temperature is slightly increased. As described above, in this initial low-temperature combustion, the combustion field environment does not reach either a smoke generating region or a NOx generating region.

Thereafter, when the main injection for transitional combustion is started (point B in FIG. 7: fuel receives the heat of the combustion field of the initial low-temperature combustion, and thus the gas temperature is increased to point B, and premixed combustion is started), the equivalence ratio of the combustion field shifts toward the rich side and the combustion field gas temperature is increased by the combustion of the fuel as the aforementioned premixed combustion proceeds. At this time, the temperature of the combustion field is increased to about the aforementioned diffusive combustion enabling temperature (900 K). In this premixed combustion as well, the combustion field environment does not reach either a smoke generating region or a NOx generating region.

When the main injection for diffusive combustion is started (point C in FIG. 7: fuel receives the heat of the combustion field of the transitional combustion, and thus the gas temperature is increased to point C, and diffusive combustion is started), diffusive combustion is started in the cylinder, the equivalence ratio of the combustion field shifts toward the rich side, and the combustion field gas temperature is increased by the combustion of the fuel. In the diffusive combustion of this case as well, the combustion field environment does not reach either a smoke generating region or a NOx generating region.

Although the equivalence ratio is increased in the latter half of this diffusive combustion, the combustion field environment is in the Y region (CO region) as shown in FIG. 7, and thus the generation of NOx or smoke is inhibited.

(In Medium-Load Operation)

On the other hand, when the engine 1 operates under a medium load, the total main injection amount is larger than that in a low load operation. If the fuel injection amounts in the respective main injections (main injection for low-temperature combustion, main injection for transitional combustion, and main injection for diffusive combustion) are universally increased in the same proportion, the combustion rate in the diffusive combustion is increased quickly, resulting in an excessively increased heat generation rate peak, and the amount of NOx generated and combustion noises are likely to be increased.

Therefore, in the medium-load operation, whereas the fuel injection amounts in the main injection for low-temperature combustion and the main injection for transitional combustion are increased, the fuel injection amount in the main injection for diffusive combustion is reduced such that the aforementioned total main injection amount can be secured (see the fuel injection pattern waveform in FIG. 5). Thereby, an increase of the amount of NOx generated and an increase of combustion noises associated with the diffusive combustion can be avoided.

For example, as stated above, in the case where the fuel injection amount in the main injection for low-temperature combustion, the fuel injection amount in the main injection for transitional combustion, and the fuel injection amount in the main injection for diffusive combustion in a low-load operation are set to be 2 mm$^3$, 6 mm$^3$, and 22 mm$^3$, respectively, the fuel injection amount in the main injection for low-temperature combustion, the fuel injection amount in the main injection for transitional combustion, and the fuel injection amount in the main injection for diffusive combustion in a medium-load operation are set to be 7 mm$^3$, 13 mm$^3$, and 20 mm$^3$, respectively. The fuel injection amounts are not limited to these values, and are suitably set through, for example, experiments or simulations.

In particular, the fuel injection amount in the main injection for low-temperature combustion is set to be at the upper limit to maintain the above-described low-temperature combustion. The upper limit of the fuel injection amount varies depending on the temperature in the cylinder at the injection start timing of the main injection for low-temperature combustion. That is, the higher the temperature in the cylinder, the lower the upper limit is set.

As in the above-described low-load operation, initial low-temperature combustion, transitional combustion, and diffusive combustion are sequentially performed also in the medium-load operation. Since the functions of these combustions are the same as those in the above-described low-load operation, descriptions thereof are omitted here.

(In High-Load Operation)

Next, combustion forms when the engine 1 operates under a high load will now be described.

As in the low-load operation and the medium-load operation described above, in diffusive combustion after performing initial low-temperature combustion, torque that is appropriate for the engine 1 operating under a high load may not be obtained sufficiently. Therefore, in this embodiment, in a high-load operation, the combustion rate is increased by performing diffusive combustion throughout the entire region of the same combustion process, and in initial diffusive combustion (the initial diffusive combustion period shown in FIG. 6), which is an initial stage of the diffusive combustion, the average heat generation rate in this period is configured so as to be substantially identical to the average heat generation rate in a period in which the aforementioned initial low-temperature combustion is performed, thereby enabling the amount of NOx generated to be suppressed.

Specifically, as shown in FIG. 6, by performing two divided main injections and setting the fuel injection amount of the earlier divided main injection (a main injection for pseudo low-temperature combustion) to be relatively small, the combustion period of this fuel is set to be short. Thereafter, a relatively large amount of fuel is injected (a main injection for diffusive combustion) so as to be able to secure a total main injection amount from which the engine torque appropriate to the load is obtained. Since the combustion in a high-load operation is diffusive combustion and the combustion rate is high, the injection timing of the main injection for pseudo low-temperature combustion is set to be more on the angle of delay side (near TDC) than the injection timing of the main injection for low-temperature combustion in the low-load operation and the medium-load operation described above is.

Thereby, in the combustion of fuel injected in the main injection for pseudo low-temperature combustion, the heat generation rate is temporarily increased and then this heat generation rate is decreased. In this embodiment, the average heat generation rate in this combustion period (initial diffusive combustion period) is configured to be substantially identical to the average heat generation rate in a period in which the initial low-temperature combustion performed in the low-load operation and the medium-load operation is performed in order to suppress the amount of NOx generated.

More specifically, the heat generation rate waveform indicated by a dashed line in FIG. 6 is a waveform in a low-load operation, and the heat generation rate indicated by a solid line is a waveform in a high-load operation. In the aforementioned initial diffusive combustion period, by configuring the area of a region (region H1 in FIG. 6) where the heat generation rate waveform in a high-load operation is higher than the heat generation rate waveform in a low-load operation and the area of a region (region H1 in FIG. 6) where the heat generation rate waveform in a high-load operation is lower than the heat generation rate waveform in a low-load operation to be substantially identical, the average heat generation rate in a high-load operation in the initial diffusive combustion period is configured to be substantially identical to the average heat generation rate in a period in which initial low-temperature combustion as performed in the aforementioned low-load operation is performed. Thereby, an effect identical to the above-described initial low-temperature combustion is obtained.

By performing such pseudo low-temperature combustion, the amount of NOx generated can be suppressed, and the required torque can be obtained while improving exhaust emissions in a high-load operation.

As described above, according to the combustion forms in the combustion fields of this embodiment, by connecting, via the aforementioned transitional combustion, initial low-temperature combustion (combustion in a relatively low-temperature environment) and diffusive combustion (combustion in a relatively-high temperature environment), which would not exist in the same combustion process of conventional diesel engines, this initial low-temperature combustion and diffusive combustion can both be present in the same combustion process without generating a no-torque period between them. Thereby, the amount of NOx generated and the amount of smoke generated can be suppressed as described above, and the aforementioned diffusive combustion can be executed by injecting fuel into the cylinder whose temperature has been increased by transitional combustion. Therefore, it is possible, by controlling the aforementioned "fuel injection period for diffusive combustion", to control the start timing of this diffusive combustion and to control the timing at which the heat generation rate reaches its peak (combustion center of gravity) in a series of combustion (combustion across initial low-temperature combustion and diffusive combustion). For example, by setting the combustion center of gravity near 10° ATDC, a combustion form that is most combustion efficient can be achieved. It is thus possible to prevent the timing at which the heat generation rate reaches its maximum from being greatly shifted toward the angle of delay side and possible to secure the required torque of an internal combustion engine. As a result, it is possible to concurrently suppress the amount of NOx generated, suppress the amount of smoke generated, and secure the required torque.

Moreover, in this embodiment, since the amount of NOx generated can be significantly reduced, it is possible to reduce the size of the aforementioned NSR catalyst 75 and DPNR catalyst 76, and since the amount of NOx generated can be substantially "0", it is possible not to use the NSR catalyst 75 or DPNR catalyst 76, and it is possible, instead, to adopt a configuration in which only a three-way catalyst is installed in the exhaust system 6. According to this configuration, it is possible to achieve in a diesel engine a relatively simple exhaust system as used in a gasoline engine.

—Modified Example—

In the embodiment described above, fuel injection periods corresponding to the aforementioned initial low-temperature combustion, transitional combustion, and diffusive combustion are individually set. That is, three fuel injections are sequentially performed so as to attain three kinds of combustion forms that correspond to the respective injections.

The present invention achieves the aforementioned initial low-temperature combustion, transitional combustion, and diffusive combustion by two fuel injections.

Figure 9:
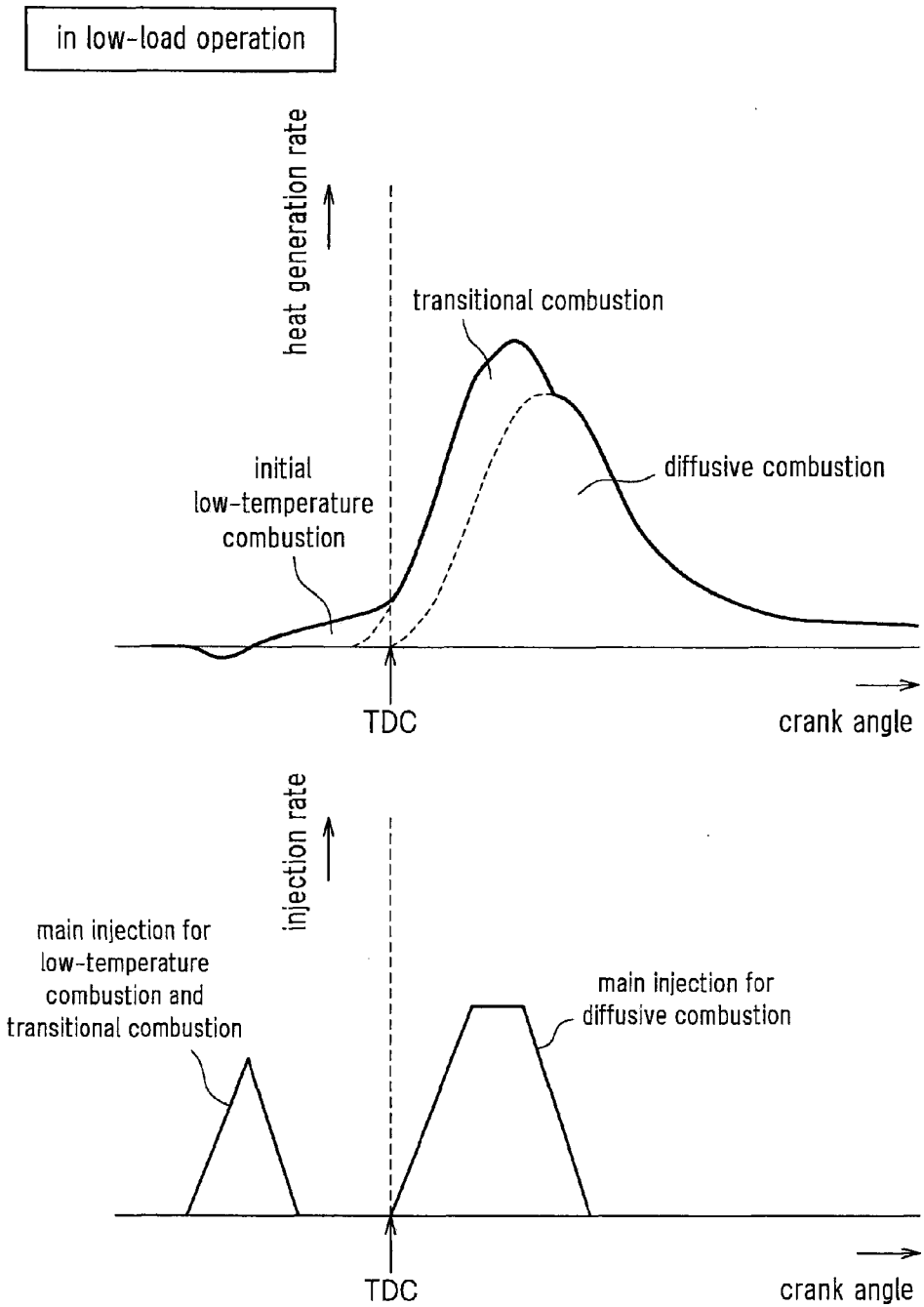
FIG. 9 depicts charts showing a change in heat generation rate and the fuel injection pattern in the cylinder when an engine operates under a low load in a modified example.
Figure 10:
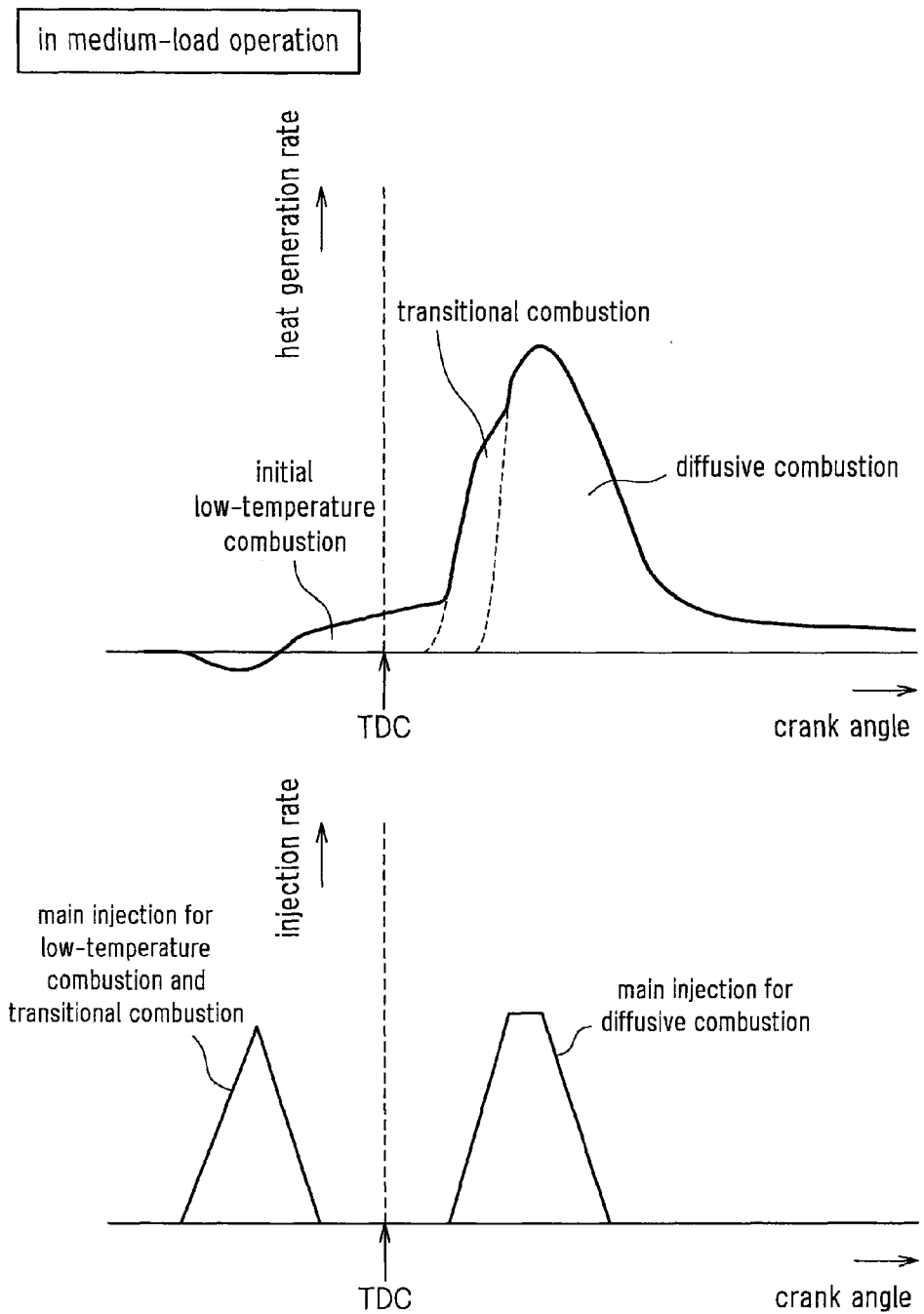
FIG. 10 depicts charts showing a change in heat generation rate and the fuel injection pattern in the cylinder when an engine operates under a medium load in a modified example.

FIG. 9 depicts charts showing a change in heat generation rate and a fuel injection pattern in the cylinder when the engine 1 operates under a low load and when main injections are performed in this modified example. Also, FIG. 10 depicts charts showing a change in heat generation rate and the fuel injection pattern in the cylinder when the engine 1 operates under a low load and when main injections are performed in this modified example. The change in heat generation rate and the fuel injection pattern when the engine 1 operates under a high load in this modified example are identical to those in the above-described embodiment, and thus descriptions are omitted here.

An earlier fuel injection in this modified example encompasses both the main injection for low-temperature combustion and the main injection for transitional combustion of the above-described embodiment. Here, the earlier fuel injection is referred to as a main injection for low-temperature combustion and transitional combustion. That is, in the injection period of this main injection for low-temperature combustion and transitional combustion, the fuel injected in the first half serves as fuel for the aforementioned initial low-temperature combustion, and the fuel injected in the latter half serves as fuel for the aforementioned transitional combustion. On the other hand, a later fuel injection corresponds to the main injection for diffusive combustion in the above-described embodiment.

Also in fuel injections as shown in FIGS. 9 and 10, as with the embodiment described above, it is possible to connect initial low-temperature combustion and diffusive combustion via transitional combustion, and this initial low-temperature combustion and diffusive combustion can both be present in the same combustion process without a no-torque period between them. Thereby, it is possible to concurrently suppress the amount of NOx generated, suppress the amount of smoke generated, and secure the required torque.

As in this modified example, in the case where the aforementioned initial low-temperature combustion, transitional combustion, and diffusive combustion are performed by two fuel injections, it is possible to set the interval of the opening or closing operation of the injector 23 so as to be relatively long, thereby enabling the above-described three combustion forms to be accomplished even with an injector 23 having a relatively low opening or closing speed (low response) and the cost of a fuel injection system to be low. Moreover, the number of injections by the injector 23 can be reduced, and it is thus possible to suppress the amount of injected fuel that flows in the same region (for example, a region near the nozzle of an injector 23: region α in FIG. 8), and even if the fuel injection amount in the aforementioned main injection for low-temperature combustion is relatively large, it is possible to suppress smoke generation associated with subsequent fuel injections in that region.

Other Embodiments

In the embodiments and modified examples described above, a case was described in which the present invention is applied to an in-line four-cylinder diesel engine mounted in an automobile. The present invention is not limited to use in an automobile, and is applicable also to engines used in other applications. Also, there is no particular limitation with respect to the number of cylinders or the engine type (classified as an in-line engine, V engine, horizontally opposed engine, and so forth).

Also, in the embodiments and modified example described above, the maniverter 77 is provided with the NSR catalyst 75 and the DPNR catalyst 76, but a maniverter provided with the NSR catalyst 75 and a diesel particulate filter (DPF) may be used as well.

In the embodiments and modified example described above, the EGR apparatus is configured such that exhaust gas in the exhaust manifold 72 is recirculated in the intake system 6. The present invention is not limited to this configuration, and an LPL (low-pressure loop) EGR apparatus may be adopted by which exhaust gas on the downstream side relative to the turbine wheel 52 in the turbocharger 5 is recirculated in the intake system 6. In this case, an increase of the temperature in the cylinder caused by EGR gas is suppressed, and it is thus possible to effectively perform the initial low-temperature combustion and the transitional combustion described above.

In the embodiments and modified example described above, the start timing of the initial low-temperature combustion performed in a low-load operation and a medium-load operation is set so as to be BTDC (on the angle of advance side relative to the compression top dead center of the piston 13). The present invention is not limited to this configuration, and the start timing of the initial low-temperature combustion may be set so as to be at TDC (compression top dead center of the piston 13), or in some cases, the start timing of the initial low-temperature combustion may be set so as to be ATDC (on the angle of delay side relative to the compression top dead center of the piston 13).

INDUSTRIAL APPLICABILITY

The present invention is applicable to fuel injection control in a common rail in-cylinder direct injection multi-cylinder diesel engine mounted in an automobile.

REFERENCE SIGNS LIST

1 Engine (internal combustion engine)
3 Combustion chamber
23 Injector (fuel injection valve)
6 Intake system
62 Throttle valve (intake throttling valve)
7 Exhaust system
8 EGR path
81 EGR valve
82 EGR cooler

The invention claimed is:

1. A control apparatus of a compression self-igniting internal combustion engine that is provided with an exhaust gas recirculation apparatus that recirculates part of exhaust gas discharged by an exhaust system in an intake system, and that performs, during a combustion process of the internal combustion engine, a main injection that is a fuel injection for torque generation from a fuel injection valve, the control apparatus comprising:
a fuel injection control means that sets, as injection periods of the main injection:
a "fuel injection period for initial combustion" for initial low-temperature combustion in which fuel is sequentially burnt in a cylinder while performing an encounter rate lowering operation that lowers an encounter rate between oxygen and a fuel spray in the cylinder,
a "fuel injection period for diffusive combustion" for performing diffusive combustion by performing, when a temperature in the cylinder is at or greater than a predetermined diffusive combustion starting temperature that leads to diffusive combustion, a fuel injection toward a region where a combustion temperature suppressing effect that is attained by exhaust gas recirculated by the exhaust gas recirculation apparatus can be used, and
a "fuel injection period for transitional combustion" that is set between the "fuel injection period for initial combustion" and the "fuel injection period for diffusive combustion", and that is for performing transitional combustion composed of premixed combustion that continuously connects the initial low-temperature combustion and the diffusive combustion, as fuel, which was injected when the temperature in the cylinder was lower than the diffusive combustion starting temperature after the initial low-temperature combustion had started, undergoes spray-cooling by an endothermic reaction of fuel injected in the subsequent "fuel injection period for diffusive combustion".

2. The control apparatus of an internal combustion engine according to claim 1, wherein
the fuel injection control means is configured so as to set a penetration of fuel injected in the "fuel injection period for diffusive combustion" to be greater than the penetration of fuel injected in the "fuel injection period for initial combustion" and the "fuel injection period for transitional combustion".

3. The control apparatus of an internal combustion engine according to claim 1, wherein
the fuel injection control means is configured so as to substantially synchronize a start timing of the "fuel injection period for diffusive combustion" with a combustion start timing of fuel injected in the "fuel injection period for transitional combustion", and to substantially synchronize a finishing timing of the "fuel injection period for diffusive combustion" with a timing at which a heat generation rate in combustion of fuel injected in the "fuel injection period for transitional combustion" reaches its maximum.

4. The control apparatus of an internal combustion engine according to claim 1, wherein
as for a fuel injection in the "fuel injection period for initial combustion", the "fuel injection period for transitional combustion", and the "fuel injection period for diffusive combustion", the fuel injection control means is configured so as to suspend a fuel injection after termination of a fuel injection in the "fuel injection period for initial combustion", then start a fuel injection in the "fuel injection period for transitional combustion", suspend a fuel injection after termination of a fuel injection in this "fuel injection period for transitional combustion", and then start a fuel injection in the "fuel injection period for diffusive combustion".

5. The control apparatus of an internal combustion engine according to claim 1, wherein
as for a fuel injection in the "fuel injection period for initial combustion", the "fuel injection period for transitional combustion", and the "fuel injection period for diffusive combustion", the fuel injection control means is configured so as to perform a fuel injection in the "fuel injection period for initial combustion" and a fuel injection in the "fuel injection period for transitional combustion" by a continuous fuel injection without stopping, and, on the other hand, to suspend a fuel injection after termination of a fuel injection in the "fuel injection period for transitional combustion" and then start a fuel injection in the "fuel injection period for diffusive combustion".

6. The control apparatus of an internal combustion engine according to any one of claim 1, wherein at least one operation selected from an exhaust gas recirculation operation by the exhaust gas recirculation apparatus, an intake throttling operation in the intake system, an operation for retarding a timing of a fuel injection from the fuel injection valve, and an operation for lowering the temperature in the cylinder is performed as the encounter rate lowering operation.

7. The control apparatus of an internal combustion engine according to claim 1, wherein the fuel injection control means is configured so as to set a period in which the temperature in the cylinder is in a range from 750 K to less than 900 K as the "fuel injection period for initial combustion", a period in which the temperature in the cylinder is in a range from 800 K to less than 900 K after the initial low-temperature combustion has started as the "fuel injection period for transitional combustion", and a period after the temperature in the cylinder reaches 900 K after the transitional combustion has started as the "fuel injection period for diffusive combustion".

8. The control apparatus of an internal combustion engine according to claim 1 wherein fuel injections in the "fuel injection period for initial combustion", the "fuel injection period for transitional combustion", and the "fuel injection period for diffusive combustion" are performed when the internal combustion engine operates under a low load and a medium load, and a proportion of a fuel injection amount in the "fuel injection period for transitional combustion" relative to a total injection amount, which is a sum of amounts of fuel injected in the respective injection periods, is set such that the greater the load in a region from the low-load operation to the medium-load operation, the greater the proportion.

9. The control apparatus of an internal combustion engine according to claim 1, wherein fuel injections in the "fuel injection period for initial combustion", the "fuel injection period for transitional combustion", and the "fuel injection period for diffusive combustion" are performed when the internal combustion engine operates under a low load and a medium load, and the control apparatus is configured such that when the internal combustion engine operates under a high load, initial diffusive combustion is performed in which an average heat generation rate over a predetermined period during an earlier period after combustion has started in the cylinder is substantially identical to an average heat generation rate over a period in which the initial low-temperature combustion is performed.

* * * * *